(12) United States Patent
Kitamura et al.

(10) Patent No.: US 8,422,761 B2
(45) Date of Patent: Apr. 16, 2013

(54) DEFECT AND CRITICAL DIMENSION ANALYSIS SYSTEMS AND METHODS FOR A SEMICONDUCTOR LITHOGRAPHIC PROCESS

(75) Inventors: Tadashi Kitamura, Yokohama (JP); Akio Ishikawa, Yokohama (JP)

(73) Assignee: NGR Inc., Yokohama (JP)

( * ) Notice: Subject to any disclaimer, the term of this patent is extended or adjusted under 35 U.S.C. 154(b) by 537 days.

(21) Appl. No.: 12/637,331

(22) Filed: Dec. 14, 2009

(65) Prior Publication Data

US 2010/0158345 A1 Jun. 24, 2010

(30) Foreign Application Priority Data

Dec. 22, 2008 (JP) ................................. 2008-326258

(51) Int. Cl.
*G06K 9/00* (2006.01)
(52) U.S. Cl.
USPC ........... 382/145; 382/144; 382/141; 382/199; 382/149; 356/237.2; 356/237.5
(58) Field of Classification Search .................. 382/141, 382/144, 149, 145, 199; 356/237.2–237.6
See application file for complete search history.

(56) References Cited

U.S. PATENT DOCUMENTS

| | | | |
|---|---|---|---|
| 4,583,854 A | 4/1986 | Lozar | |
| 4,589,139 A | 5/1986 | Hada et al. | |
| 4,805,123 A * | 2/1989 | Specht et al. | 382/144 |
| 4,958,374 A | 9/1990 | Tokita et al. | |
| 5,046,109 A | 9/1991 | Fujimori et al. | |
| 5,046,113 A | 9/1991 | Hoki | |
| 5,051,585 A | 9/1991 | Koshishiba et al. | |
| 5,137,362 A | 8/1992 | LeBeau | |
| 5,270,796 A | 12/1993 | Tokui et al. | |
| 5,379,350 A | 1/1995 | Shimazu et al. | |

(Continued)

FOREIGN PATENT DOCUMENTS

| | | |
|---|---|---|
| DE | 19803021 A1 | 7/1998 |
| EP | 0930499 | 7/1999 |

(Continued)

OTHER PUBLICATIONS

U.S. Appl. No. 11/044,159, Notice of Allowance dated Sep. 25, 2009, 9 pages.

(Continued)

*Primary Examiner* — Tarifur Chowdhury
*Assistant Examiner* — Isiaka Akanbi
(74) *Attorney, Agent, or Firm* — Lathrop & Gage LLP

(57) ABSTRACT

Apparatus and method evaluate a wafer fabrication process for forming patterns on a wafer based upon design data. Within a recipe database, two or more inspection regions are defined on the wafer for analysis. Patterns within each of the inspection regions are automatically selected based upon tendency for measurement variation resulting from variation in the fabrication process. For each inspection region, at least one image of patterns within the inspection region is captured, a reference pattern, represented by one or both of (a) one or more line segments and (b) one or more curves, is automatically generated from the design data. An inspection unit detects edges within each of the images and registers the image with the reference pattern. One or more measurements are determined from the edges for each of the selected patterns and are processed within a statistical analyzer to form statistical information associated with the fabrication process.

8 Claims, 14 Drawing Sheets

U.S. PATENT DOCUMENTS

| | | | |
|---|---|---|---|
| 5,398,292 A | 3/1995 | Aoyama | |
| 5,407,763 A | 4/1995 | Pai | |
| 5,479,537 A | 12/1995 | Hamashima et al. | |
| 5,533,144 A | 7/1996 | Fan | |
| 5,563,702 A | 10/1996 | Emery et al. | |
| 5,574,800 A | 11/1996 | Inoue et al. | |
| 5,600,734 A | 2/1997 | Okubo et al. | |
| 5,764,793 A | 6/1998 | Omae et al. | |
| 5,796,868 A | 8/1998 | Dutta-Choudhury | |
| 5,801,965 A | 9/1998 | Takagi et al. | |
| 5,807,649 A | 9/1998 | Liebmann et al. | |
| 5,978,501 A | 11/1999 | Badger et al. | |
| 6,023,530 A | 2/2000 | Wilson | |
| 6,040,911 A | 3/2000 | Nozaki et al. | |
| 6,047,083 A | 4/2000 | Mizuno | |
| 6,049,895 A | 4/2000 | Sugimoto | |
| 6,072,897 A | 6/2000 | Greenberg et al. | |
| 6,222,935 B1 | 4/2001 | Okamoto | |
| 6,282,309 B1* | 8/2001 | Emery | 382/145 |
| 6,356,300 B1 | 3/2002 | Shiba | |
| 6,399,953 B1 | 6/2002 | Kitamura | |
| 6,400,839 B1 | 6/2002 | Takayama | |
| 6,504,947 B1 | 1/2003 | Nozaki et al. | |
| 6,535,621 B1 | 3/2003 | Fujita | |
| 6,539,106 B1 | 3/2003 | Gallarda et al. | |
| 6,546,308 B2 | 4/2003 | Takagi et al. | |
| 6,868,175 B1 | 3/2005 | Yamamoto et al. | |
| 7,180,586 B2* | 2/2007 | Neumann et al. | 356/237.5 |
| 7,181,059 B2 | 2/2007 | Duvdevani et al. | |
| 7,206,443 B1 | 4/2007 | Duvdevani et al. | |
| 7,234,128 B2 | 6/2007 | Gau et al. | |
| 7,388,978 B2 | 6/2008 | Duvdevani et al. | |
| 7,454,051 B2 | 11/2008 | Hirano et al. | |
| 7,526,119 B2 | 4/2009 | Isomura et al. | |
| 8,010,307 B2 | 8/2011 | Fang et al. | |
| 8,119,310 B1 | 2/2012 | Lu et al. | |
| 2004/0081350 A1 | 4/2004 | Kitamura et al. | |
| 2004/0120571 A1 | 6/2004 | Duvdevani et al. | |
| 2004/0126005 A1 | 7/2004 | Duvdevani et al. | |
| 2005/0110987 A1* | 5/2005 | Furman et al. | 356/237.4 |
| 2005/0146714 A1 | 7/2005 | Kitamura et al. | |
| 2005/0226494 A1 | 10/2005 | Yamamoto et al. | |
| 2006/0039597 A1 | 2/2006 | Kotani et al. | |
| 2006/0245636 A1 | 11/2006 | Kitamura et al. | |
| 2009/0110262 A1 | 4/2009 | Noguchi et al. | |
| 2010/0278416 A1 | 11/2010 | Xiao et al. | |
| 2010/0328655 A1 | 12/2010 | Den Boef | |

FOREIGN PATENT DOCUMENTS

| | | |
|---|---|---|
| JP | 63088682 | 4/1988 |
| JP | 63-210606 | 9/1988 |
| JP | 03-235949 | 10/1991 |
| JP | 04-172239 | 6/1992 |
| JP | 4-194702 | 7/1992 |
| JP | 02299481 | 9/1992 |
| JP | 8-76359 | 3/1996 |
| JP | 08110305 | 4/1996 |
| JP | 09-312318 | 12/1997 |
| JP | 10307917 | 11/1998 |
| JP | 10312461 | 11/1998 |
| JP | 11231507 | 8/1999 |
| JP | 2001-338304 | 12/2001 |
| JP | 2002-515650 | 5/2002 |
| JP | 2002-310929 | 10/2002 |
| JP | 2003-100825 | 4/2003 |
| WO | WO 99/59200 | 11/1999 |

OTHER PUBLICATIONS

U.S. Appl. No. 11/044,159, Terminal Disclaimer dated Aug. 11, 2009, 3 pages.
U.S. Appl. No. 11/044,159, Response to Office Action dated Jul. 31, 2009, 13 pages.
U.S. Appl. No. 11/044,159, Office Action dated Jun. 12, 2009, 22 pages.
U.S. Appl. No. 11/044,159, Response to Office Action dated Mar. 25, 2009, 16 pages.
U.S. Appl. No. 11/044,159, Office Action dated Dec. 11, 2008, 20 pages.
U.S. Appl. No. 11/044,159, Response to Office Action dated Aug. 29, 2008, 16 pages.
U.S. Appl. No. 11/044,159, Office Action dated Apr. 30, 2008, 11 pages.
U.S. Appl. No. 09/648,372, Notice of Allowance dated Oct. 28, 2004, 7 pages.
U.S. Appl. No. 09/648,372, Response and Amendment dated Sep. 3, 2004, 14 pages.
U.S. Appl. No. 09/648,372, Office Action dated Jun. 3, 2004, 7 pages.
U.S. Appl. No. 09/648,372, Preliminary Amendment and Response to Restriction Requirement dated Mar. 18, 2004, 15 pages.
U.S. Appl. No. 09/648,372, Restriction Requirement dated Feb. 19, 2004, 5 pages.
U.S. Appl. No. 09/648,372, Response to Office Action dated Dec. 12, 2003, 31 pages.
U.S. Appl. No. 09/648,372, Office Action dated Aug. 13, 2003, 7 pages.
U.S. Appl. No. 11/058,616, Office Action dated Aug. 14, 2009, 22 pages.
U.S. Appl. No. 11/058,616, Response to Office Action filed Nov. 9, 2009, 28 pages.
U.S. Appl. No. 11/058,616, Office Action dated Jan. 13, 2010, 7 pages.
U.S. Appl. No. 11/058,616, Response to Office Action filed Apr. 26, 2010, 29 pages.
U.S. Appl. No. 11/434,797, Office Action dated Aug. 17, 2009, 18 pages.
U.S. Appl. No. 11/434,797, Response to Office Action filed Nov. 9, 2009, 18 pages.
U.S. Appl. No. 11/434,797, Office Action dated Jan. 15, 2010, 8 pages.
U.S. Appl. No. 11/434,797, Response to Office Action filed Apr. 14, 2010, 18 pages.
U.S. Appl. No. 11/434,797, Notice of Allowance dated May 10, 2010, 6 pages.
U.S. Appl. No. 11/987,766, Office Action dated Jan. 15, 2010, 11 pages.
U.S. Appl. No. 11/987,766, Office Action filed Apr. 14, 2010, 23 pages.
Hashimoto, K, et al. "Tolerance-Based Wafer Verification Methodologies with a Die-to-Database Inspection System", Jpn. J. Appl. Phys. 48 (2009), pp. 076502-1-076502-7.
Hagio, Y, et al. "Novel Mask-Qualification Methodology with Die-to-Database Wafer Inspection System", Proc. of SPIE 7379 (2009), pp. 73790V-1-73790V-9.
Hagio, Y, et al. "Hotspot Management for Spacer Patterning Technology with Die-to-Database Wafer Inspection System", Proc. of SPIE 7275 (2009), pp. 72750V-1-72750V-10.
Yang, H, et al. "Systematic Defect Filtering and Data Analysis Methodology for Design Based Metrology", Proc. of SPIE (2009), 8 pages.
Kim, J, et al. "The APC (Advanced Process Control) Procedure for Process Window and CDU Improvement using DBMs", Proc. of SPIE 7140 (2008), pp. 71403G-1-71403G-11.
Yune, H, et al. "CD uniformity improvement of sub 60nm contact hole using model based OPC", Proc. of SPIE 7140 (2008), pp. 71403E-1-71403E-8.
Park, D, et al. "Novel process proximity correction by the pattern to pattern matching method with DBM", Proc. of SPIE 7140 (2008), pp. 71403K-1-71403K-8.
Hashimoto, K, et al. "Hot Spot Management with Die-to-Database Wafer Inspection System", Proc. of SPIE 6925 (2008), pp. 692517-1-692517-8.
Hashimoto, M., et al., High-Speed Template Matching Algorithm Using Information of Contour Points, Systems and Computers in Japan, vol. 23, No. 9, 1992, pp. 78-87.
Haralick, R.M., Digital Step Edges from Zero Crossing of Second Directional Derivatives, IEEE Transactions on Pattern Analysis and Machine Intelligence, vol. PAMI-6, No. 1, Jan. 1984, pp. 58-68.

Park, J, et al. "Systematic Defect Inspection and Verification for Distributions of Critical Dimension in OPC Models Utilizing Design Based Metrology Tool", Proc. of SPIE 6922 (2008), pp. 69222C-1-69222C-9.

Yang, H, et al. "Wide Applications of Design Based Metrology with Tool Integration", Proc. of SPIE 6922 (2008), pp. 692239-1-692239-7.

Kitamura, T, et al. "A New Robust Process Window Qualification (PWQ) Technique to Perform Systematic Defect Characterization to Enlarge the Lithographic Process Window, using a Die-to-Database Verification Tool (NGR2100)", Proc. of SPIE 6925 (2008), pp. 692519-1-692519-5.

Yamaguchi, S, et al. "Accuracy of Mask-Pattern Contour Extraction with Fine-pixel SEM Images", Proc. of SPIE 6730 (2007), pp. 673036-1-673036-12.

Lau, M, et al. "A SEM-based System for Photomask Placement Metrology", Proc. of SPIE 6607 (2007), pp. 660727-1-660727-11.

Melliar-Smith, M, "Lithography Beyond 32nm—A Role for Imprint?", Proc. of SPIE (2007), 14 pages.

Kitamura, T, et al. "Die-to-Database Verification Tool for detecting CD errors, which are caused by OPC Features, by using Mass Gate Measurement and Layout Information", Proc. of SPIE 6518 (2007), pp. 651834-1-651834-5.

Yang, H, et al. "Advanced Process Control with Design Based Metrology", Proc. of SPIE 6518 (2007), pp. 651821-1-651821-8.

Kim, J, et al, "OPC and Design Verification for DFM using Die-to-Database Inspection", Proc. of SPIE 6521 (2007), pp. 652117-1-652117-10.

Kim, C, et al. "DFM flow by using combination between design based metrology system and model based verification at sub-50-nm memory device", Proc. of SPIE 6521 (2007), pp. 65210T-1-65210T-4.

Tsuneoka, M, et al, "Direct Die to Database Electron Beam Inspection of Fused Silica Imprint Templates", Proc. of SPIE 6349 (2006), pp. 63492D-1-63492D-8.

Hoffman, M, et al. "Introduction of a Die-to-Database Verification Tool for Mask Geometry NGR4000", Proc. of SPIE 6349 (2006), pp. 634940-1-634940-6.

Yang, H, et al. "New OPC Verification Method using Die-to-Database Inspection", Proc. of SPIE 6152 (2006), pp. 615232-1-615232-9.

Myron, L, et al. "Defect inspection for Imprint Lithography Using a Die to Database Electron Beam Verification System", Proc. of SPIE (2006), 9 pages.

Kitamura, T, et al. "Introduction of a Die-to-Database Verification Tool for the Entire Printed Geometry of a Die—Geometry Verification System NGR2100 for DFM", Proc. of SPIE 5853 (2005), pp. 968-999.

Kitamura, T. et al., Die-to-Database Verification Tool for detecting CD errors, which are caused by OPC Features, by using Mass Gate Measurement and Layout Information (2007), 9 pages.

Wada, S. & Nakamura, T., Automatic Fault Tracing Method With Electron Beam Tester for Logic LSIs, NEC Technical Report, vol. 50, No. 6, 1997 (with partial English translation) 36 pages.

Steger, C., An Unbiased Detector of Curvillinear Structures, IEEE Trans on Pattern Analysis and Machine Intelligence, vol. 20, No. 2, Feb. 1998, pp. 113-125.

Pavlidis, T, & Horowitz, S.L., Segmentation of Plane Curves, IEEE Transactions on Computers vol. c-23, No. 8, Aug. 1974, pp. 860-870.

U.S. Appl. No. 11/987,766 Restriction Requirement mailed May 20, 2010, 9 pages.

U.S. Appl. No. 11/987,766 Response to Restriction Requirement filed Jun. 20, 2010, 21 pages.

U.S. Appl. No. 11/987,766 Office Action mailed Nov. 24, 2010, 8 pages.

"Automatic Failure Part Tracing Method for a Logic LSI Using an Electron Beam Tester", NEC Technical Report, vol. 50, No. 6, 1997, pp. 20-31 (partial English translation).

Official Notice of Rejection, Japanese Patent Office, dated Feb. 21, 2003, for Patent Appln. No. 2000-258234, with English Translation.

U.S. Appl. No. 11/987,766, Restriction Requirement mailed Jul. 27, 2010, 7 pages.

U.S. Appl. No. 11/987,766, Response to Restriction Requirement filed Aug. 24, 2010, 17 pages.

U.S. Appl. No. 11/058,616, Notice of Allowance mailed Jun. 14, 2010, 6 pages.

Resnick, D. et al., "A template infrastructure for step-and-flash imprint lithography", Microlithography World, Feb. 2006, Accessed on the Internet Mar. 9, 2006.

Resnick, D. et al., "Template Advances in Step and Flash Imprint Lithography", undated, 5 pages.

Melliar Smith, M. et al. "Step and Flash Imprint for Silicon Integrated Circuit Applications" NGL 2006, Jul. 6-7, 2006, Tokyo, Japan, 4 pages.

Kitamura, T., Hasebe, T. et al. "Die-to-database verification tool using mass gate measurement and Layout Information for detecting critical dimension errors" Proc. of SPIE vol. 6518 (2007) pp. 651834-1-651834-9.

U.S. Appl. No. 11/987,766, Response to Advisory Action filed Feb. 22, 2011, 15 pages.

U.S. Appl. No. 11/987,766, Advisory Action mailed Feb. 2, 2011, 3 pages.

U.S. Appl. No. 11/987,766, Response to Final Office Action filed Jan. 24, 2011, 18 pages.

U.S. Appl. No. 11/987,766, Examiner Interview Summary mailed Jan. 20, 2011, 3 pages.

U.S. Appl. No. 11/987,766, Examiner Interview Summary mailed Dec. 29, 2010, 3 pages.

U.S. Appl. No. 12/852,314, Response to Office Action filed Feb. 16, 2011, 20 pages.

U.S. Appl. No. 12/852,314 Office Action mailed Nov. 19, 2010, 17 pages.

U.S. Appl. No. 12/852,314, Office Action mailed Apr. 20, 2011, 11 pages.

U.S. Appl. No. 12/852,314, Response to Office Action filed Jun. 17, 2011, 12 pages.

U.S. Appl. No. 12/852,314, Notice of Allowance mailed Jul. 14, 2011, 3 pages.

U.S. Appl. No. 11/987,766 Notice of Allowance mailed Mar. 2, 2011, 7 pages.

U.S. Appl. No. 12/725,141, Office Action mailed Jul. 22, 2011, 10 pages.

U.S. Appl. No. 12/725,141, Response to Office Action filed Sep. 27, 2011, 13 pages.

U.S. Appl. No. 12/725,141, Notice of Allowance mailed Nov. 28, 2011, 9 pages.

U.S. Appl. No. 13/152,227, Office Action mailed Mar. 1, 2012, 9 pages.

U.S. Appl. No. 13/152,227 Response to Office Action filed May 22, 2012, 20 pages.

U.S. Appl. No. 13/152,227 Notice of Allowance mailed Jun. 6, 2012, 9 pages.

* cited by examiner

NOT DRAWN TO SCALE

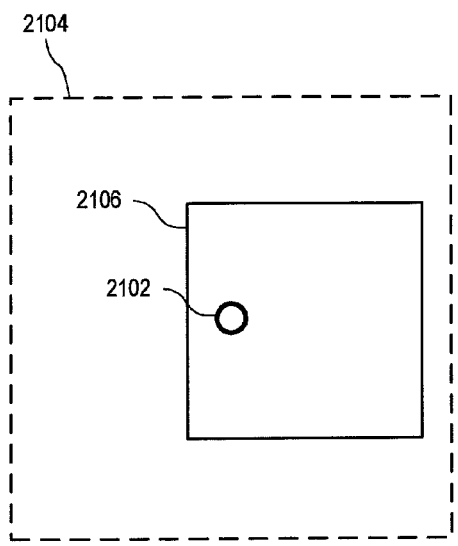
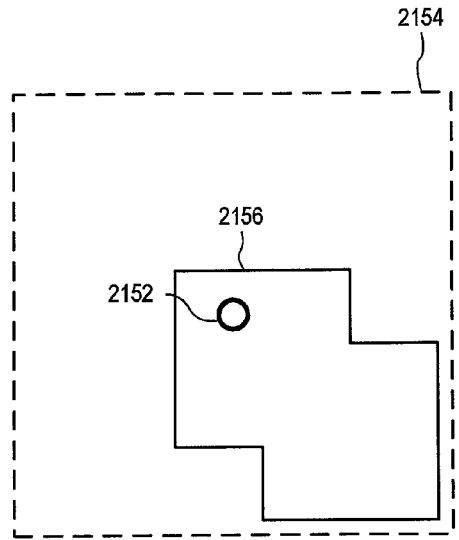
*FIG. 21A*  *FIG. 21B*
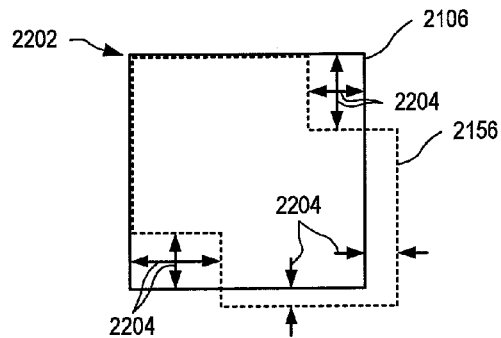
*FIG. 22*
*FIG. 23*

DEFECT AND CRITICAL DIMENSION ANALYSIS SYSTEMS AND METHODS FOR A SEMICONDUCTOR LITHOGRAPHIC PROCESS

BACKGROUND

Manufacture of semiconductor wafers uses a complex and precise lithographic process. Quality control and analysis of the lithographic process through each stage of wafer manufacture is critical to ensure the quality and reliability of the final product. Inconsistencies within the lithographic process are undesirable and early detection and correction of these inconsistencies saves a significant amount of time and expense for the manufacturer. For example, if problems with lithographic line and space definition can be identified after resist development and before etching, wafers can be reworked. Similarly, if lithographic issues can be identified soon after etching, process adjustments can be made many weeks sooner than would be required if wafer completion and electrical testing is required before making adjustments.

Typically, wafers are viewed and measured using a critical dimension-scanning electron microscope (CD-SEM) technique, wherein an electron microscope is used to image pattern features within a small portion of a wafer and measurements of the pattern features may be made. However, the CD-SEM technique images only a small portion (e.g., less than 1 µm square at a time without distortion) of the wafer, and requires many days/weeks of continuous imaging and analysis to evaluate the entire wafer. Thus, manufacturers typically image a few sample points of a wafer using CD-SEM to evaluate the wafer as a whole. Such limited sampling, however, may not be representative of the wafer as a whole, since only a small fraction of formed patterns is actually evaluated. Further, CD-SEM typically makes a single critical dimension (CD) measurement of an imaged pattern, which may give skewed results because of localized process variation across a wafer. That is, the CD measurement made by CD-SEM may not be particularly representative of the wafer as a whole because of the localized process variation.

In the view of measurement accuracy of CD-SEM devices, errors in line width measurements of a pattern are near to an allowable error of control values of process conditions. It is necessary to improve accuracy of the measurement of the line width of the pattern by using an average of measurements of line widths of patterns.

SUMMARY OF THE INVENTION

In an embodiment, a method evaluates a wafer fabrication process for forming patterns on a wafer based upon design data. Within a recipe database, two or more inspection regions are defined on the wafer for analysis. Patterns within each of the inspection regions are automatically selected based upon tendency for measurement variation resulting from variation in the fabrication process. For each of the inspection regions, at least one image of patterns within the inspection region is captured using an imaging device. A reference pattern for each of the inspection regions is automatically generated from the design data and is represented by one or both of (a) one or more line segments and (b) one or more curves. An inspection unit detects edges within each of the images and registers the image with the reference pattern. One or more measurements are determined from the edges for each of the selected patterns and are processed within a statistical analyzer to form statistical information associated with the fabrication process. The statistical information is output as an evaluation of the fabrication process.

In another embodiment, an inspection apparatus evaluates a fabrication process used to form patterns on a wafer. The inspection apparatus includes a scanning electron imager for capturing at least one image of each of a plurality of selected inspection regions on the wafer. A reference pattern generator of the inspection apparatus generates a reference pattern for each of the selected inspection regions based upon design data of the patterns formed within the inspection regions. The reference pattern is represented by one or both of (a) one or more line segments and (b) one or more curves. An inspection unit of the inspection apparatus selects the plurality of inspection regions, automatically selects at least one pattern within each inspection region based upon tendency for measurement variation resulting from variation in the fabrication process, detects edges within the at least one image, and compares certain of the edges with associated line segments and curves of the reference pattern to generate one or more measurements. A statistical analyzer of the inspection apparatus processes the measurements to form statistical information associated with the fabrication process, and an output unit of the inspection apparatus outputs the statistical information as an evaluation of the fabrication process.

In another embodiment, an inspection apparatus evaluates a fabrication process used to fabricate a wafer. The inspection apparatus includes an imager for capturing at least one image of each of a plurality of inspection regions on the wafer and a reference pattern generator for generating a reference pattern for each of the inspection regions from design data of the wafer. The reference pattern is formed of one or both of (a) one or more line segments and (b) one or more curves. An inspection unit of the inspection apparatus detects edges within each of the images, automatically selects patterns within each of the inspection regions based upon tendency for measurement variation resulting from variation in the fabrication process, and compares, for the selected patterns, certain of the edges with associated line segments and curves of the reference pattern to determine one or both of (a) a maximum empty circle within the boundary of the certain edges and (b) a smallest enclosing rectangle that includes the certain edges. A statistical analyzer of the inspection apparatus determines one or more modifications to parameters of the fabrication process based upon the statistical information.

In another embodiment, an inspection apparatus evaluates defects in patterns fabricated on a wafer by a fabrication process. The inspection apparatus includes an imager for capturing at least one image of each of at least one inspection region on the wafer and a reference pattern generator for generating a reference pattern for each of the inspection regions from design data of the patterns, the reference pattern being formed of one or both of (a) one or more line segments and (b) one or more curves. An inspection unit of the inspection apparatus detects edges within the image, compares certain of the edges with associated line segments and curves of the reference pattern to determine the defects, applies, within the design data and centered on the location of each of the defects, a windowing region to select a windowed pattern associated with the defect, compares, for each of the defects, the windowed pattern associated with the defect against each windowed pattern associated with the other defects to determine a difference value for each pair of defects, and groups defects having difference values less than a predefined difference value threshold. An output unit of the inspection apparatus outputs information of the grouped defects.

In another embodiment, a method evaluates a fabrication process of a wafer. The method determines measurements WEi of patterns formed on the wafer prior to the fabrication process, measurements WRi of the patterns after the fabrication process, and then subtracts measurements WEi from measurements WRi to form difference measurements. The method then statistically analyzes the difference measurements to evaluate the fabrication process.

In another embodiment, a method evaluates a fabrication process of a wafer by determining measurements WAi of the patterns formed on the wafer after the fabrication process and determining measurements WGi of patterns formed on a known good wafer by a substantially similar process to the fabrication process. The method then subtracts measurements WAi from measurements WGi to form difference measurements and statistically analyzes the difference measurements to evaluate the fabrication process.

BRIEF DESCRIPTION OF THE FIGURES

FIGS. 21A and 21B shows identified first and second defects, around each of which a first and second design data windowing region is centered and used to isolate first and second design data patterns, respectively.

FIG. 22 shows the pattern of FIG. 21B overlaid upon the pattern of FIG. 21A such that vertices of the patterns coincides to measure a difference value that is indicative of similarity in the patterns.

FIG. 23 shows an exemplary table of difference values for five identified defects.

DETAILED DESCRIPTION OF THE PREFERRED EMBODIMENTS

Figure 1:
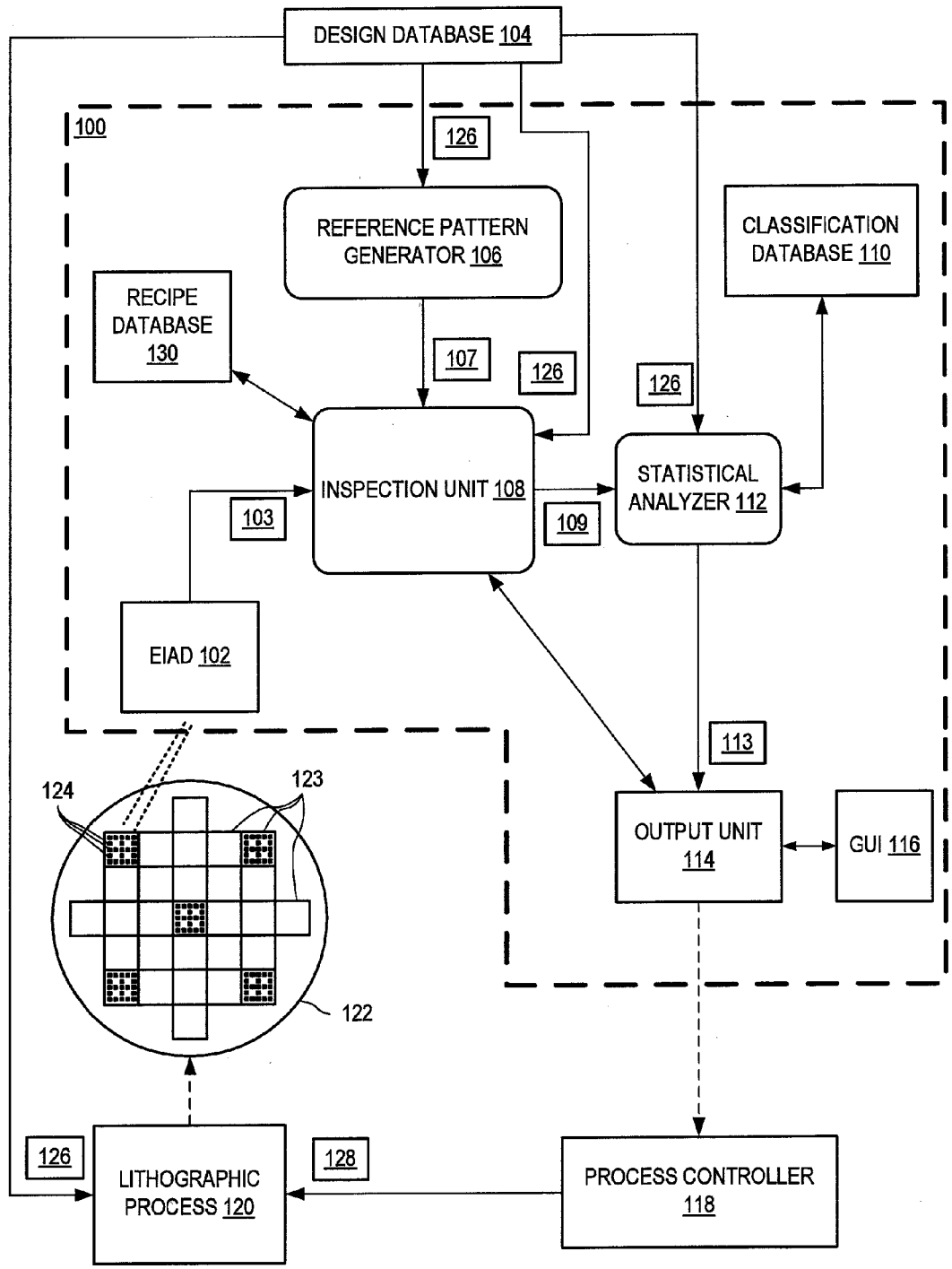
FIG. 1 shows one exemplary defect analysis system for a semiconductor lithographic process, in an embodiment.

FIG. 1 shows one exemplary defect analysis system 100 for a semiconductor lithographic process 120. System 100 includes an electron image acquiring device (EIAD) 102, a reference pattern generator 106, an inspection unit 108, a statistical analyzer 112 and an output unit 114. System 100 may also include a graphical user interface (GUI) 116 that allows a user to interact with system 100 and view output from statistical analyzer 112. System 100 may include at least part of the functionality of the pattern inspection apparatus shown in FIG. 15 of U.S. application Ser. No. 11/987,766 (hereinafter the '766 Application), filed Dec. 4, 2007, incorporated herein by reference. For example, EIAD 102 may represent image generation device 7 shown in FIGS. 1, 15, 16, and 17 of the '766 Application; reference pattern generator 106 may represent reference pattern generation unit 11 shown in FIGS. 16 and 17 of the '766 Application; classification database 110 may represent defect class reference database 23 shown in FIGS. 16 and 17 of the '766 Application; and design database 104 may represents fundamental database 21 shown in FIGS. 16 and 17 of the '766 Application. Terms used within this application may represent similar terms within the '766 Application. For example, the term 'pattern,' as used herein, may be referred to as 'pattern to-be-inspected' within the '766 Application.

Lithographic process 120 fabricates, under control of at least one control input 128 of a process controller 118, a plurality of shots 123, or patterns, on a wafer 122 based upon design data 126 of design database 104. Design data 126 represents computer aided design (CAD) data for producing at least one die within each shot 123 of wafer 122. Control input 128 may represent control of any one or more of dose, etching, and exposure of lithographic process 120, but may represent other control parameters of lithographic process 120 without departing from the scope hereof. For example, control input 128 may provide adjustments to one or more optical proximity correction (OPC) rules of lithographic process 120.

Wafer 122 is analyzed by system 100 after each of several sub-process steps (e.g., masking, etching) of lithographic process 120 such that system 100 provides input to process controller 118 to allow control inputs 128 to be selected for each sub-process of lithographic process 120 performed on wafer 122 (and/or subsequently processed wafers).

Under control of inspection unit 108, EIAD 102 acquires at least one image 103 of at least one inspection region 124 of wafer 122 using a high resolution high speed secondary electron acquisition capability. This high speed secondary electron acquisition capability includes a scan generator to acquire large area images using electron optics that eliminate field distortion over the wide scanning area. For example, EIAD 102 may capture image 103 at a resolution of 3 nm per pixel where inspection region 124 is 50 micrometers (μm) square. In comparison, although prior art CD-SEM may capture images at higher resolutions, the area captured is less than 1 μm square and therefore includes only a few patterns (e.g., gates and tracks, including aluminum and/or copper wiring). Image 103 of inspection region 124 may include thousands of patterns that are automatically registered and measured by inspection unit 108. The patterns are registered by detecting edges within image 103 and the detected edges are measured to generate measurements 109. Inspection unit 108 determines inspection regions 124 based upon input from a recipe database 130, which may be configured by a user of system 100 to identify specific patterns formed on wafer 122 for analysis. For example, recipe database 130 may identify particular structures of scribeline test patterns and other structures having known drawn dimensions. Inspection unit 108 may therefore control system 100, based upon recipe database 130, to automatically capture and process images of a plurality of inspection regions 124. That is, unlike CD-SEM imaging that is usually controlled by a human operator, imaging and analysis of wafer 122 by system 100 is substantially automated and the area imaged and analyzed is significantly greater than possible with the CD-SEM in a reasonable amount of time.

Reference pattern generator 106 generates reference pattern 107 from design data 126 for each imaged inspection region 124. Reference pattern 107 defines the expected geometry of patterns formed within each imaged inspection region 124 based upon the performed lithographic sub-processes on wafer 122. Reference pattern 107 is formed of one or both of (a) one or more line segments typically oriented parallel to one or both axes, and (b) one or more curves. Reference pattern generator 106 may anticipate corner rounding and other processing variations to define reference pattern 107.

Inspection unit 108 automatically registers (i.e., aligns) and compares detected edges of image 103 to reference pattern 107 and generates measurements 109. Measurements 109 may represent the difference (bias) between detected edges and the associated reference pattern and may also represent direct measurements of edges detected in image 103. The '766 Application describes edge detection and measurement in detail. Further detail of edge detection, reference pattern, and bias measurement, as performed by system 100, may be found in a paper titled "Introduction of a die-to-database verification tool for the entire printed geometry of a die: geometry verification system NGR2100 for DFM" by Tadashi Kitamura et al. [Proc. SPIE, Vol. 5756, 73 (2005); DOI:10.1117/12.599467], hereinafter "DFM paper", and incorporated herein by reference. Further details on analysis of optical proximity correction (OPC) features may be found in a paper titled "Die-to-database verification tool for detecting CD errors, which are caused by OPC features, by using mass gate measurement and layout information" by Tadashi Kitamura et al. [Proc. SPIE, Vol. 6518, 651834 (2007); DOI: 10.1117/12.712413], incorporated herein by reference.

Statistical analyzer 112 processes measurements 109 and design data 126 to determine statistical data 113 for one or more inspection regions 124, and may also utilize a classification database 110 to classify and sort measurements 109 prior to statistical analysis.

Controlling Process Conditions Using Statistics of Line Width Measurements

With the traditional CD-SEM method of measuring line widths of a pattern formed on a wafer, measurement error can be near allowable error of the control values of the process conditions. Therefore, CD-SEM measurements are often not appropriate for controlling fabrication processes. To use measurements for controlling fabrication processes, it is desirable to improve the accuracy of the measurements (e.g., line width measurements of imaged patterns) by averaging measurements of many instances of a pattern formed by the fabrication process. It is therefore desirable to use an inspection region that includes multiple instances of the pattern such that multiple measurements may be made and then averaged.

Inspection regions 124 each contain many instances of the pattern to be measured, and many inspection regions 124 are selected for analysis, such that many measurements of the pattern may be made and statistically analyzed. For example, each inspection region 124 has many instances of the pattern within each image of inspection region 124. Further, since registration of image 103 (i.e., matching of the imaged patterns to associated reference pattern 107 generated from design data 126) and measurements of patterns therein are performed automatically, multiple inspection regions may be specified (e.g., within recipe database 130) for each of multiple shots 123 on wafer 122.

Figure 24:
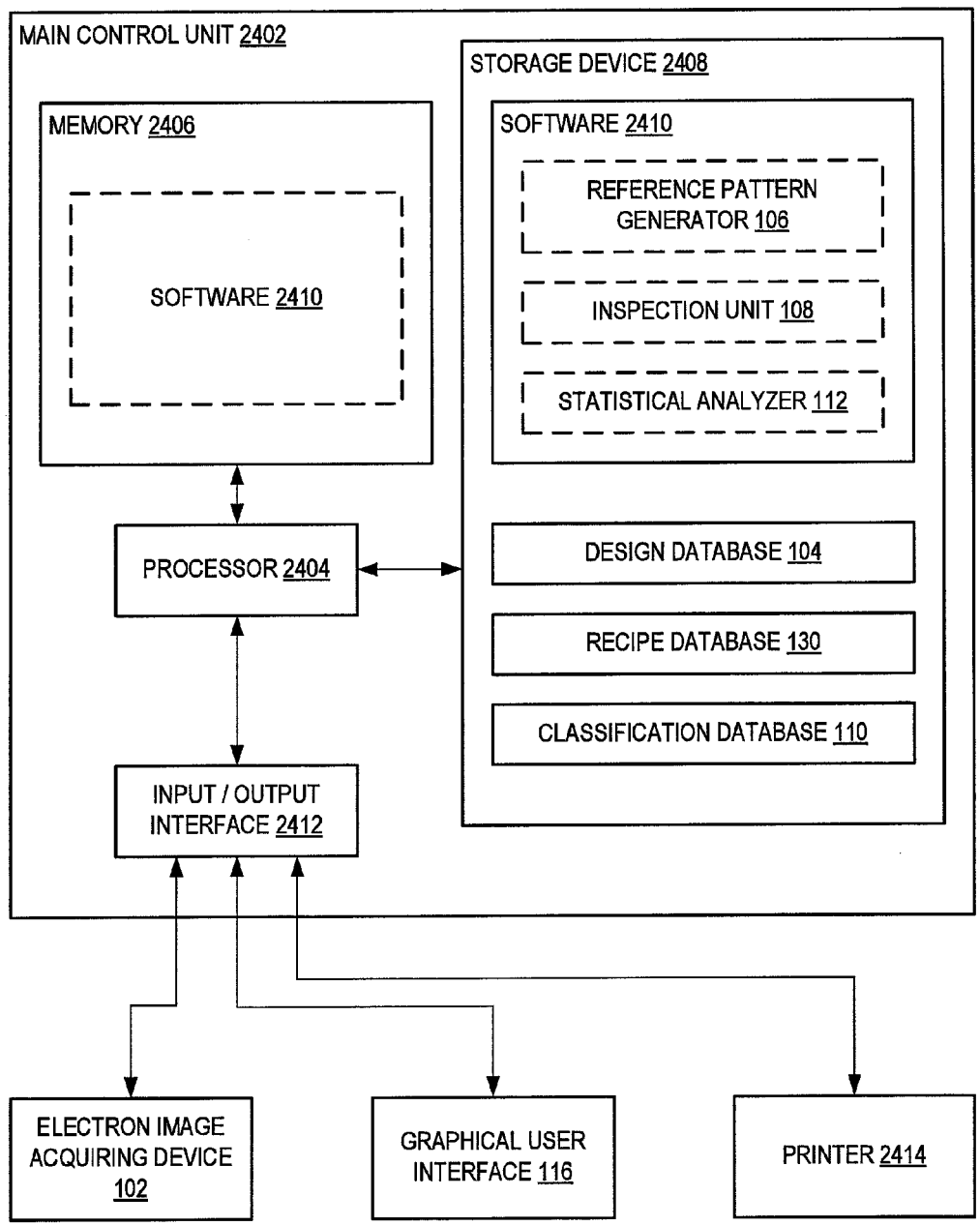
FIG. 24 schematically illustrates a defect analysis system for a semiconductor lithographic process, in an embodiment.

FIG. 24 schematically illustrates a defect analysis system 2400 for a semiconductor lithographic process. System 2400 includes a main control unit 2402, EIAD 102, GUI 116 and a printer 2414. Main control unit 2402 includes a processor 2404, memory 2406, a storage device 2408 and an input/output interface 2412. Storage device 2408 may represent any type of non-volatile storage media, such as any one or more selected from the group consisting of a hard drive, an optical drive, and Flash memory.

Processor 2404 may represent one or more processing units and/or processing cores that execute at least part of software 2410 within memory 2406. Memory 2406 may represent any type of volatile random access memory (RAM) that is accessible by processor 2404. Although shown within main control unit 2402, storage device 2408 may be located external to, and in communication with, main control unit 2402, without departing from the scope hereof. Input/output interface 2412 provides connectivity between processor 2404, memory 2406 and/or storage device 2408 and one or more of EIAD 102, GUI 116 and printer 2414.

Storage device 2408 stores software 2410 that includes instructions, executable by processor 2404 when loaded at least in part into memory 2406, for performing functionality of at least part of each of reference pattern generator 106, inspection unit 108 and statistical analyzer 112. Software 2410 is illustratively shown is dashed outline within memory 2406.

Main control unit 2402 may represent a personal computer and/or a server computer that is loaded with software 2410 to perform certain functionality of system 100, FIG. 1.

Figure 2:
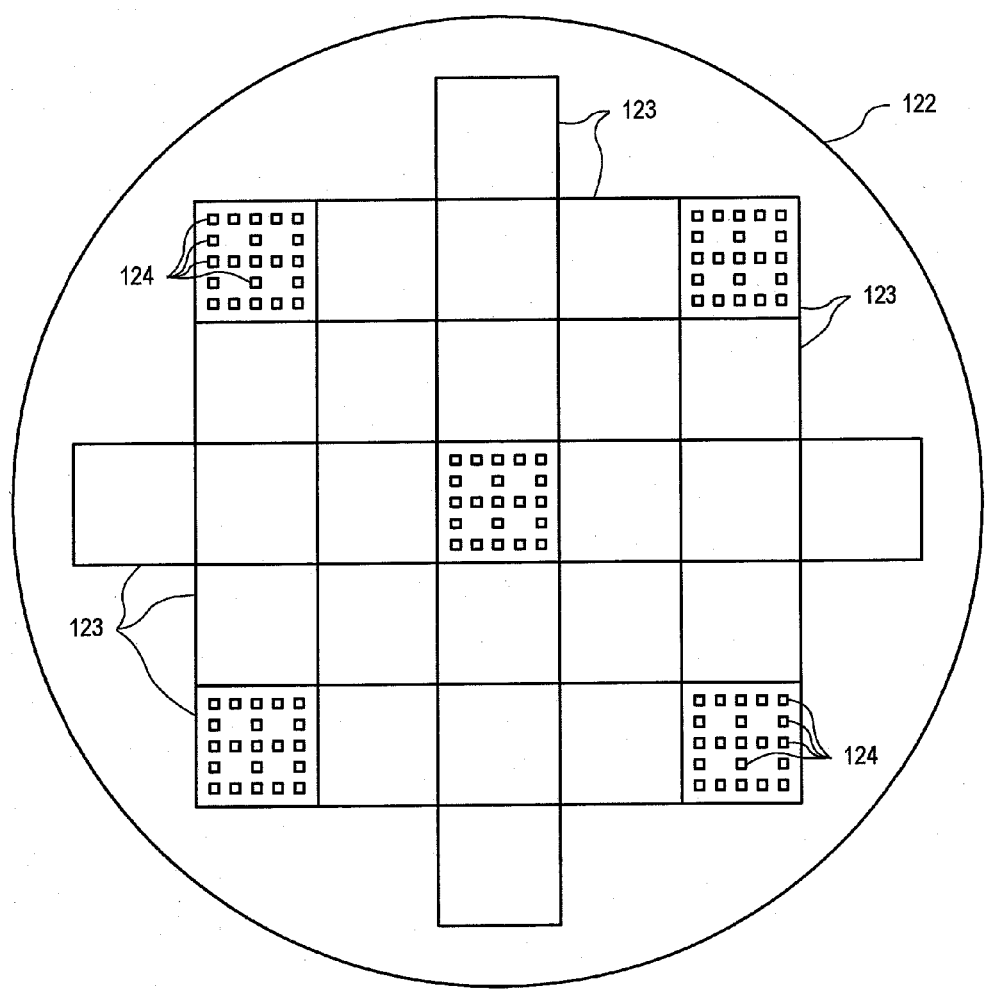
FIG. 2 shows the wafer of FIG. 1 having twenty-nine shots, five of which each have twenty-one inspection regions.

FIG. 2 shows wafer 122 of FIG. 1 having twenty-nine shots 123, wherein five selected shots each have twenty-one inspection regions 124. Inspection regions 124 may be elements of die, or may be elements of test patterns located in scribelines. Since hundreds of measurements may be made within each inspection region, statistical analysis of these measurements provide a substantially more accurate representation of the fabrication process of wafer 122 than can be determined from individual measurements made by prior art CD-SEM. In the prior art, CD-SEM inspection operators typically make five measurements of a pattern in each of five shots on a wafer, and these twenty-five measurements are used to indicate quality of the entire wafer. The greater number of inspection regions, and the greater the number of measurements taken and analyzed, the greater the quality of the result and the greater opportunity to determine skew of parameters across a wafer as well as mean values and standard deviations.

In a perfect world, measurement of each fabricated pattern within each shot on the wafer would yield the best result. However, even when fully automated, measurement of an entire wafer, although possible, would take too long to be of any use. By defining appropriate shots, patterns and inspection regions within recipe database 130, sufficient measurements may be taken within a reasonable amount of time to provide good control of lithographic fabrication processes.

Figure 3:
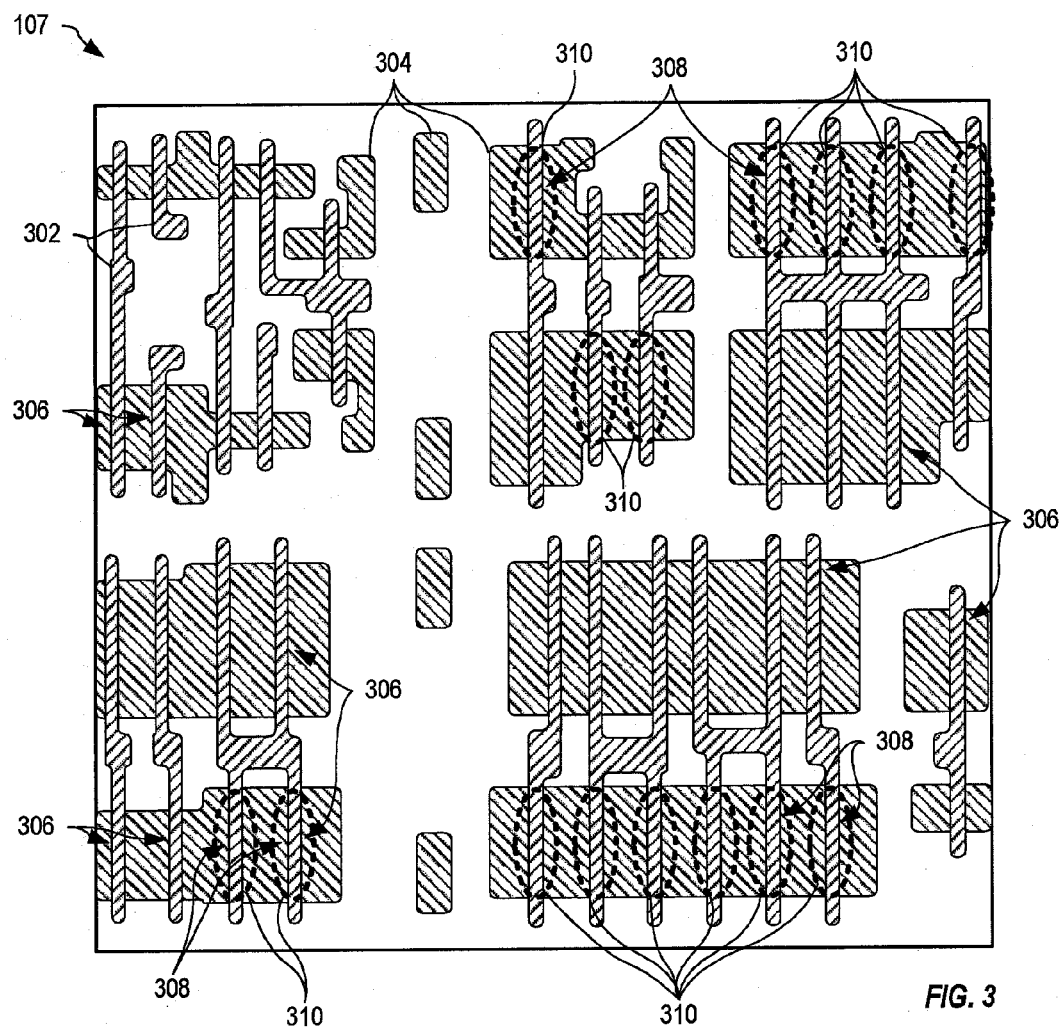
FIG. 3 is a schematic showing exemplary detail of the reference pattern of FIG. 1 as generated for the inspection region.

FIG. 3 is a layout diagram showing exemplary detail of reference pattern 107 generated for one inspection region 124. Where each shot 123 of wafer 122 is fabricated to have identical circuitry, reference pattern 107 may represent one or more of inspection regions 124, as shown in FIGS. 1 and 2. Reference pattern 107 is shown with two patterned layers 302 and 304 that may represent one or more of polysilicon gate and active N or P type layers formed on wafer 122. Where layers 302 and 304 overlap, gate oxides 306 are typically formed on wafer 122.

Within reference pattern 107, a plurality of patterns 308 (e.g., gates) are selected for analysis, as indicated by the dashed oval 310. Selection of patterns 308 may be made automatically based upon the type of wafer analysis to be performed. Further detail on pattern selection is provided below.

Figure 4:
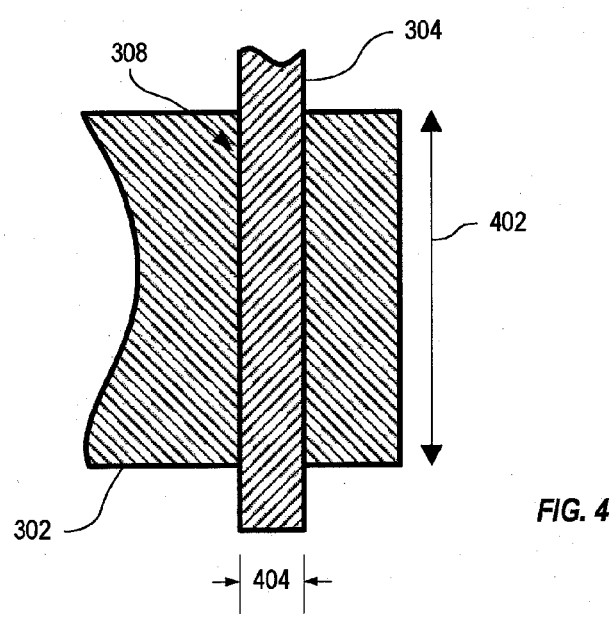
FIG. 4 shows exemplary width and length measurements of one gate of the reference pattern of FIG. 3.

Line widths of the patterns within each inspection region are determined as described in section 5.3.1 Method of inspecting gate line width of the '766 Application. FIG. 4 shows exemplary width 404 and length 402 measurements of pattern 308 of reference pattern 107 formed from layers 302 and 304. Based upon reference pattern 107, patterns within image 103 are automatically registered and measured based upon detected edges. A gate width is, for example, typically 45 nm, and since inspection region 124 covers an area greater than 1 $\mu m^2$, a large number of such gates are typically fabricated within inspection region 124. Selecting, and measuring such a large number of gates is not practically feasible without automatic registration (and optional selection). That is, manual measurements of such numbers of gates using prior art CD-SEM would be impractical.

More specifically, it is necessary to obtain measurements of line widths of patterns within numerous inspection regions of numerous shots distributed over the wafer, as illustrated in FIG. 2. Although inspection regions are shown arranged in an even distribution within each shot, and an even shot selection is shown, inspection regions may be assigned to areas that are more vulnerable to variation in process conditions, thereby providing greater determination of fabrication process performance. For example, previously collected data may indicate areas more vulnerable to process variation, and thereby allow inspection unit 108 to automatically select inspection regions 124 based upon previously detected faults.

Figure 5A:
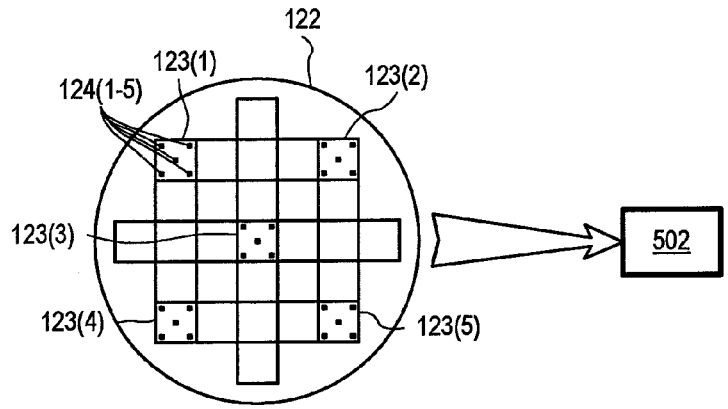
FIG. 5A graphically illustrates processing of pattern measurements of five inspection regions in each of five shots of the wafer of FIG. 1 to produce a statistic indicative of overall fabrication process quality of the wafer.

FIG. 5A graphically illustrates processing of pattern measurements (e.g., gate width measurements) of five inspection regions 124(1-5) in each of five shots 123(1-5) of wafer 122 to produce a statistic 502 indicative of overall fabrication process quality of wafer 122. Inspection unit 108 determines measurements for each inspection region 124(1-5) in each shot 123(1-5) of wafer 122 and statistical analyzer 112 processes these measurements to generate measurement statistics 502. Since measurement statistics 502 includes processed measurement data from shots 123 across wafer 122, measurement statistics 502 are indicative of overall fabrication process quality of wafer 122.

Figure 5B:
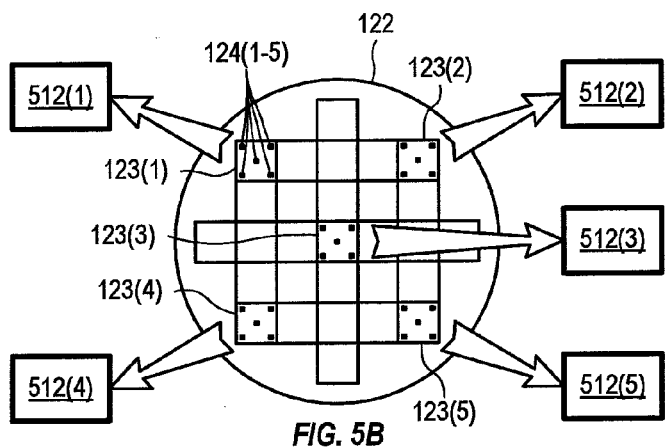
FIG. 5B graphically illustrates processing of pattern measurements for five inspection regions in each of five shots of the wafer of FIG. 1 to produce statistics indicative of fabrication process quality of each shot.

FIG. 5B graphically illustrates processing of pattern measurements (e.g., gate width measurements) for five inspection regions 124(1-5) in each of five shots 123(1-5) of wafer 122 to produce statistics 512(1-5), where each statistic 512 is indicative of fabrication process quality of shots 123(1-5), respectively. That is, for each shot 123(1-5), inspection unit 108 determines measurements for each inspection region 124(1-5) and statistical analyzer 112 processes these measurements to generate statistics 512(1-5), respectively. Each group of statistics 512(1-5) may then be compared to determine differences in fabrication process quality across wafer 122. Further, statistics 512(1-5) may also be compared to overall wafer measurement statistic 502.

Figure 5C:
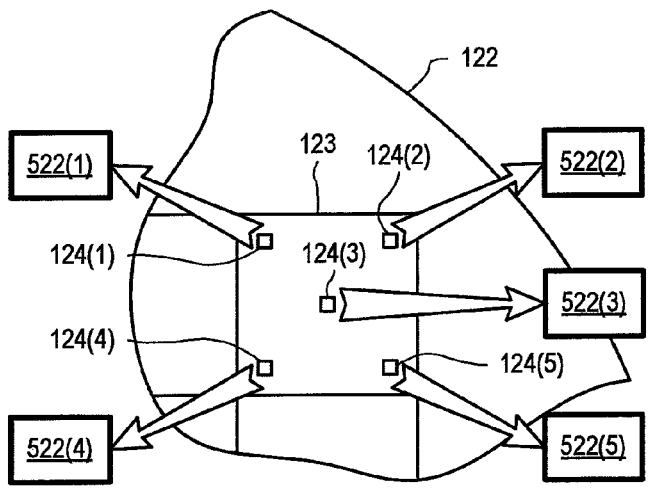
FIG. 5C graphically illustrates processing of pattern measurements for five inspection regions within one shot of the wafer of FIG. 1 to produce statistics indicative of fabrication process quality across the shot.

FIG. 5C graphically illustrates processing of pattern measurements (e.g., gate width measurements) for five inspection regions 124(1-5) within shot 123 of wafer 122 to produce statistics 522(1-5), where each statistic 522 is indicative of fabrication process quality across shot 123. That is, for shot 123, inspection unit 108 determines measurements for each inspection region 124(1-5) and statistical analyzer 112 processes these measurements to generate statistic 522(1-5). Each statistic 522(1-5) may then be compared to determine differences and/or variation in fabrication process quality across shot 123. Further, statistics 522(1-5) may also be compared to statistic 512 associated with shot 123.

Where measurements are of line width, tendency in variation of line width may be further analyzed to identify variation tendency across the wafer, and/or within each shot. Although five shots 123 are shown selected, more or fewer shots may be selected, without departing from the scope hereof. Although five inspection regions 124 are shown within each selected shot, more or fewer inspection regions may be used without departing from the scope hereof.

Classification of Measurements Based Upon Design Data Characteristics

A variation may be related to measured line widths of a first set of patterns having the same design width. Another variation may be related to measured line widths of a second set of patterns having the same design width, which is different from the design width of the first set of patterns. Variations in these measured line width may include various components of independent variations. To assess and control the fabrication processes sufficiently, line width measurements for numerous different design line widths are measured and analyzed. Further, other pattern characteristics, based upon the associated design data, affect fabricated line widths of the patterns. Thus, classification of measurements may be based upon design data characteristics for one or more of pattern direction, kinds of pattern, space between patterns, types of adjacent patterns, and density of adjacent patterns. The line width measurements are sorted, based upon one or more of the associated design data characteristics and then statistically analyzed for trends in variation of line width.

In an embodiment, measured line widths for patterns associated with a range of design data line widths may be analyzed to determine an evaluation of the fabrication process. For example, a first statistical analysis of measured line widths may be made for measurements having an associated design data line width in the range from 30 nm to 32 nm, a second statistical analysis may be made for measurements having an associated design data line width in the range from 32 nm to 34 nm, and so on.

In the prior art, where distributions corresponding to different design line width values are merged, the accuracy of the resulting statistic deteriorates. To prevent such accuracy deterioration, differences between the measured line widths and the line width defined within the associated design data are used to form the statistic, thereby allowing statistics to be combined without deterioration.

Further classification of line width measurements may be based upon a direction of the pattern as defined within the associated design data. Typically, within the design data, horizontal and vertical directions are used for gates, with diagonal and curved gates often avoided, although other directions may be used in some designs. Measurements selected for statistical analysis may be based upon one or more defined line directions, including, but not limited to, horizontal, vertical, and directions in multiples of 45 degrees.

Further classification of line width measurement may be based upon an associated gate type within the design data. For example, where measured line widths correspond to a gate defined within the design data, the associated gate type (e.g., P-type and N-type) may be used to further classify the line width measurements prior to statistical analysis. The generated statistics thereby providing insight into fabrication processes that may differ in some ways for each gate type.

Further classification of measured line widths may be made by determining, from associated design data, a width between the measured pattern and patterns formed adjacent to the measured pattern.

Figure 6:
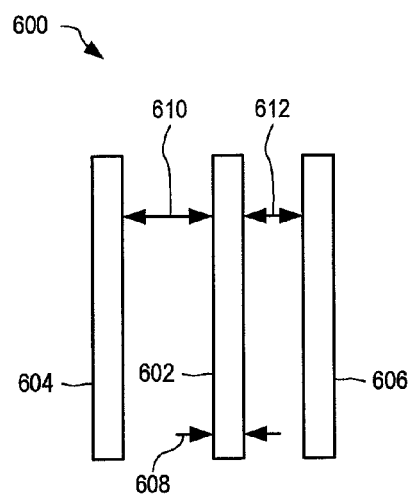
FIG. 6 and FIG. 7 are schematic diagrams showing exemplary portion of the design data of FIG. 1 that show a pattern and its spacing to two adjacent patterns.
Figure 7:
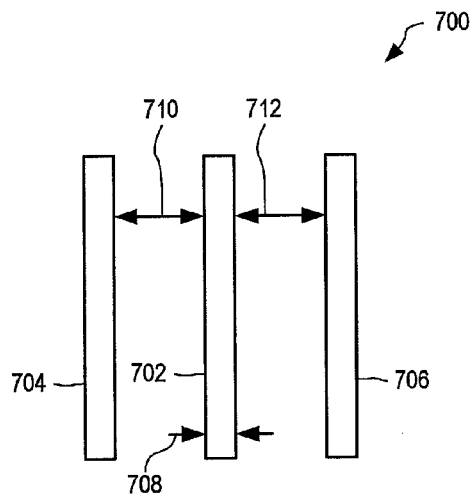

FIG. 6 is a schematic diagram showing a first portion 600 of design data 126 that includes a pattern 602 and its two adjacent patterns 604 and 606. Pattern 602 has a defined width 608 and has a defined space distance 610 from pattern 604 and a defined space distance 612 from pattern 606. FIG. 7 is a schematic diagram showing a second portion 700 of design data 126 that includes a pattern 702 and its two adjacent patterns 704 and 706. Pattern 702 has a defined width 708 and is spaced a distance 710 from pattern 704 and a distance 712 from pattern 706. Patterns 602, 604, 606, 702, 704 and 706 may represent design data for gates to be formed on a wafer during fabrication of the design data. Prior to statistical analysis of width measurements of patterns 602 and 702 fabricated on wafer 122, these width measurements may also be classified based upon spacing around the pattern (i.e., distances 610, 612, and 710, 712, respectively).

In one example of operation, defined width 608 is classified based upon one or more of a sum, an average and a minimum of space distances 610 and 612, and defined width 708 is classified based upon one or more of a sum, an average and a minimum, of space distances 710 and 712. By grouping measured widths based upon these classifications, statistics may be generated for ranges of pattern spacing, such that these statistics show greater detail for each pattern spacing range, unlike the prior art where spacing is not taken into account, resulting in less meaningful (blurred) statistics. This is of particular significance for wafer fabrication processes, since pattern spacing results in significant variation in resulting pattern widths. By analyzing pattern widths based upon pattern spacing, greater understanding (and hence control) of fabrication processes is possible. Further, direction of spaces relative to measured patterns may also be used to classify measured widths prior to statistical analysis.

Figure 8:
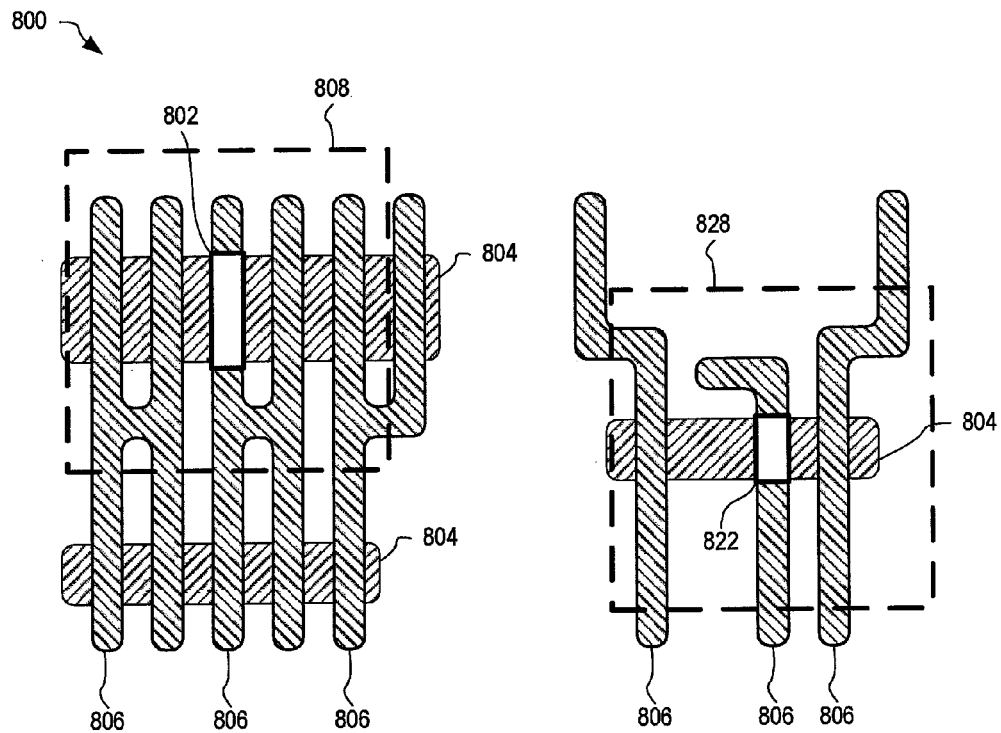
FIG. 8 graphically shows two exemplary layers in a portion of the design data of FIG. 1.

An alternative classification of measured pattern widths may be made based upon densities of patterns in areas adjacent to the measured pattern. Pattern density of an area may be determined by the equation:

Pattern Density=Area of Patterns in Neighboring Region/Area of Neighboring Region Thus, rather than determining spaces, and space directions around the measured pattern, the density of patterns around the measured pattern may be used to provide an alternative classification. FIG. 8 graphically shows two exemplary layers 804, 806, in a portion 800 of design data 126. A width measurement of the pattern associated with first gate 802 is classified by evaluating the density of patterns within a neighboring region 808 surrounding gate 802. Similarly, a pattern density is determined for a second gate 822 based upon a neighboring region 828 surrounding gate 822. As shown, region 808 has a higher pattern density than region 828, such that measured widths of gates 802 and 822 are classified differently. In one embodiment, ranges of pattern density are used in a similar manner to ranges of the pattern line widths to classify measured patterns prior to statistical analysis.

Measurements are automatically determined for each inspection region, classified and then analyzed to generate one or more different types of statistic. That is, patterns may be automatically selected from design data 126 based upon classification criteria, such that system 100 may automatically image and measure, classify and analyze the patterns to generate appropriate data for control of fabrication processes. Although averaging is a common statistical analysis used to analyze measurements, other statistics, such as standard deviation, maximum value, and minimum value, may be generated. In the prior art, where CD-SEM is used to perform a measurement within each inspection region, the limited number of measurements inhibits the generation of meaningful statistics. For example, using CD-SEM to measure singular values within each of five inspection regions within each of five selected shots on a wafer provides only twenty-five measurement values from the wafer, and thus obtained statistical information is of limited value. It is noted that even this limited quantity of prior art measurements made with the CD-SEM is time consuming.

A variation in any one process condition of the wafer fabrication may cause large variations in an average of line widths measured over the wafer and small variations in a standard deviation of those measurements. On the other hand, a variation in another process condition of the wafer fabrication may cause small variations in an average of line widths measured across the wafer and large variations in a standard deviation of those measurements. Thus, by comparing both average and standard deviation statistics of the measurements, clues to causes of the variation in the process condition may be identified.

Although the examples shown herein utilize a plurality of inspection regions located within a plurality of shots on the wafer, a plurality of inspection regions within a plurality of dies may also be used without departing from the scope hereof. Also, although the examples herein utilize a line width of patterns formed on the wafer, other measurements may also be used without departing from the scope hereof. For example, any one or more of average line width, space width, and average space width of line-shaped patterns may be used, where, in the above examples, the line width and the space width are transposed. See the '766 Application for details of determining measurements from within inspection regions.

Figure 9:
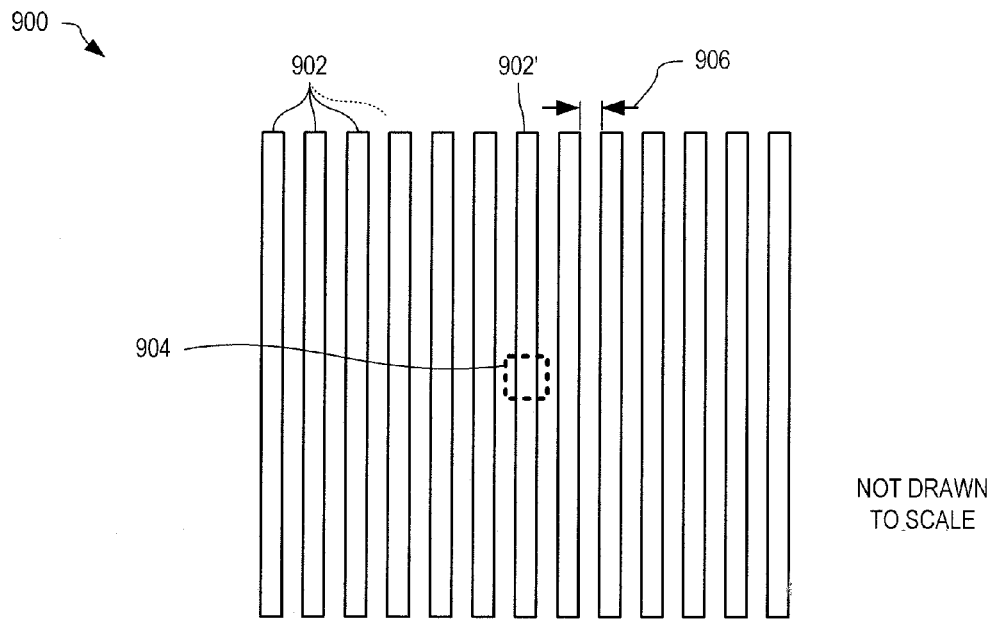
FIG. 9 shows one exemplary inspection region containing test patterns formed on a wafer with a defined pattern spacing.

To evaluate the effects of pattern spacing on fabrication processes, patterns are formed onto the wafer in a plurality of test regions, where pattern spacing within each region is one of 120 nm, 110 nm, 100 nm, 90 nm, 80 nm, 70 nm, and 60 nm. FIG. 9 shows one exemplary inspection region 900 containing patterns 902 formed on the wafer with a spacing 906. A width of pattern 902' is measured within a central part of inspection region 900, as indicated by square 904. Inspection region 900 is substantially square, having an area of 36 µm² (i.e., having sides of approximately 6 µm). Patterns 902 have a design width of 70 nm within each test region. Thus, each inspection region 900 contains between 31 and 46 patterns 902.

Figure 10:
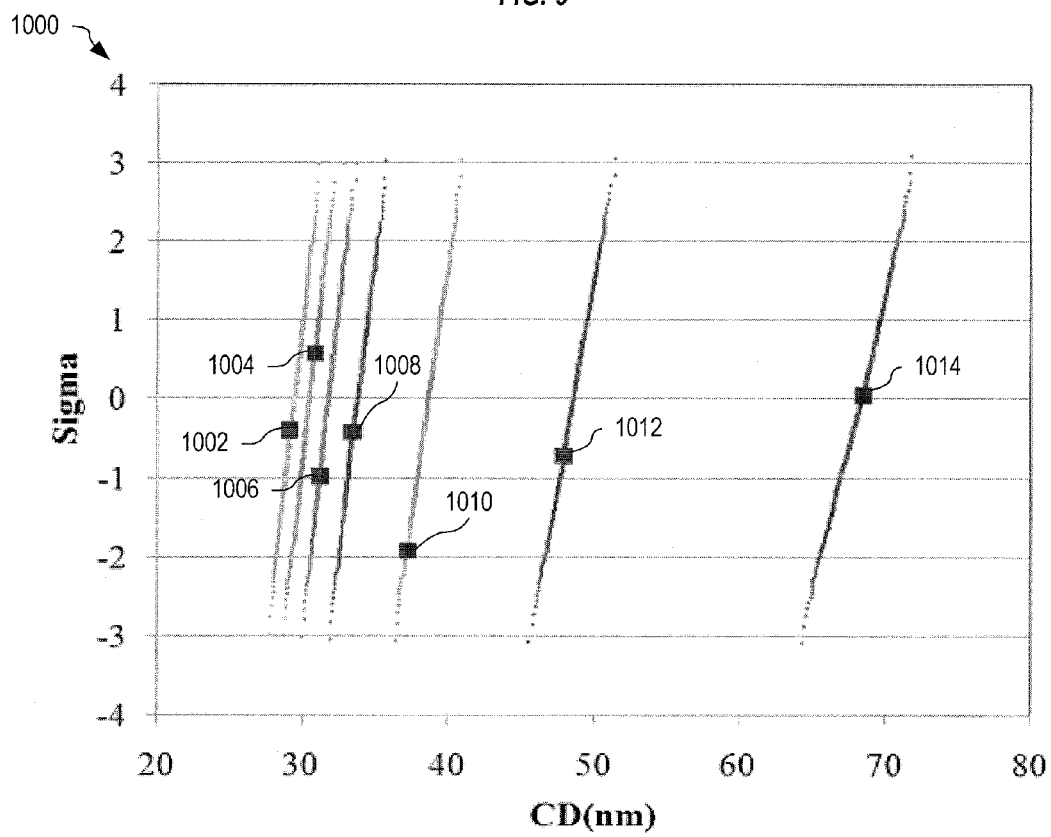
FIG. 10 is a normal probability plot of a distribution of measured line widths for the test patterns of FIG. 9 formed for each of the seven pattern spacing values 120 nm, 110 nm, 100 nm, 90 nm, 80 nm, 70 nm, and 60 nm.

FIG. 10 is a normal probability plot 1000 of a distribution of measured line widths (within square 904) for patterns 902', FIG. 9, formed within inspection region 900 for each of the seven pattern spacing values 120 nm, 110 nm, 100 nm, 90 nm, 80 nm, 70 nm, and 60 nm. The horizontal axis of plot 1000 represents the measured line width, and the vertical axis represents a standard deviation.

A point 1002 represents a measured width of pattern 902' within inspection region 900 for the pattern spacing of 120 nm, and plotted points extending therefrom represent other pattern width measurements within inspection region 900 for the same pattern spacing and having a standard deviation of 0.59 nm.

A point 1004 represents a measured width of pattern 902' within inspection region 900 for the pattern spacing of 110 nm, and plotted points extending therefrom represent other pattern width measurements within inspection region 900 for the same pattern spacing and having a standard deviation of 0.61 nm.

A point 1006 represents a measured width of pattern 902' within inspection region 900 for the pattern spacing of 100 nm, and plotted points extending therefrom represent other pattern width measurements within inspection region 900 for the same pattern spacing and having a standard deviation of 0.60 nm.

A point 1008 represents a measured width of pattern 902' within inspection region 900 for the pattern spacing of 90 nm, and plotted points extending therefrom represent other pattern width measurements within inspection region 900 for the same pattern spacing and having a standard deviation of 0.65 nm.

A point 1010 represents a measured width of pattern 902' within inspection region 900 for the pattern spacing of 80 nm, and plotted points extending therefrom represent other pattern width measurements within inspection region 900 for the same pattern spacing and having a standard deviation of 0.75 nm.

A point 1012 represents a measured width of pattern 902' within inspection region 900 for the pattern spacing of 70 nm, and plotted points extending therefrom represent other pattern width measurements within inspection region 900 for the same pattern spacing and having a standard deviation of 0.94 nm.

A point 1014 represents a measured width of pattern 902' within inspection region 900 for the pattern spacing of 60 nm, and plotted points extending therefrom represent other pattern width measurements within inspection region 900 for the same pattern spacing and having a standard deviation of 1.31 nm.

Figure 11:
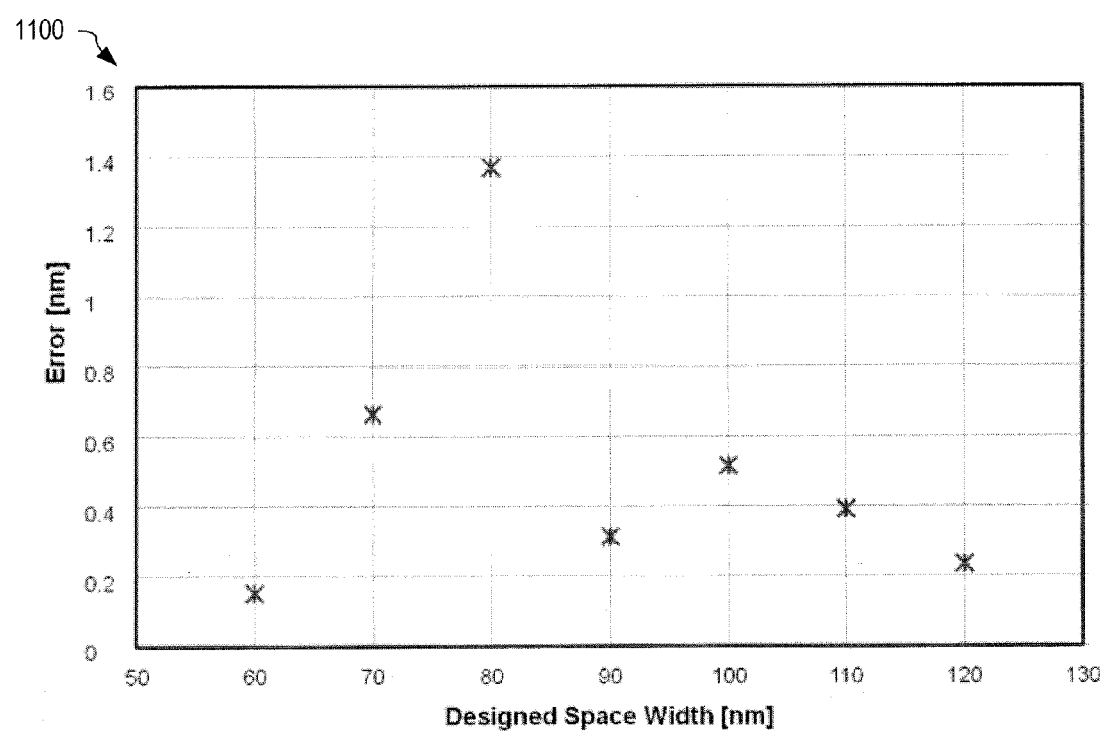
FIG. 11 shows a graph plotting line width error against designed space width for each test region having designed pattern spacing of 60 nm, 70 nm, 80 nm, 90 nm, 100 nm, 110 nm, and 120 nm.

FIG. 11 shows a graph 1100 plotting line width error against designed space width for each central part (e.g., square 904, FIG. 9) of inspection regions (e.g., inspection region 900) for each test region having designed pattern spacing of 60 nm, 70 nm, 80 nm, 90 nm, 100 nm, 110 nm, and 120 nm. Of note, the absolute values of differences disperse without correlation to the space width, and the errors of the measured line widths obtained from central parts (e.g., square 904) of inspection regions 900 are larger than the average of the error values of the distributions of measurements of line widths for each of the tested pattern spacing values.

Figure 12:
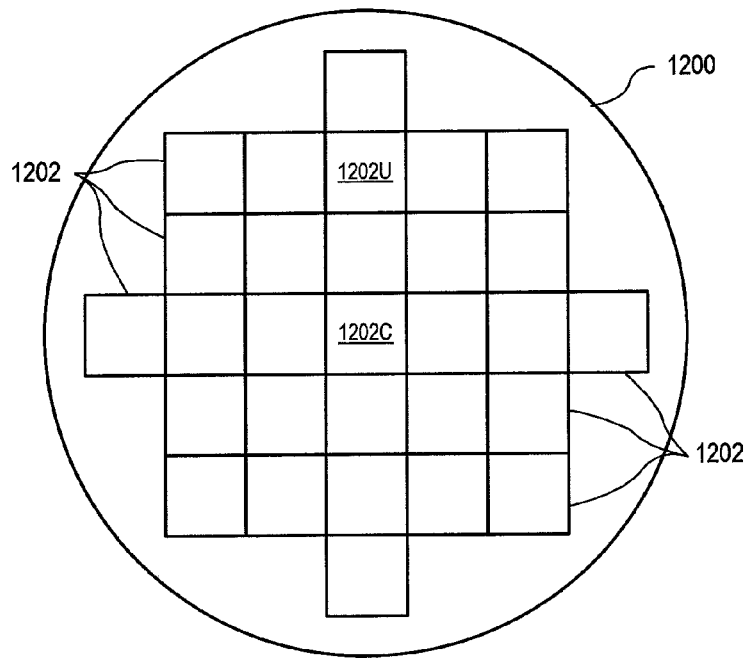
FIG. 12 shows one exemplary wafer having a plurality of shots fabricated using substantially the same fabrication parameters (conditions).

FIG. 12 shows one exemplary wafer 1200 having a plurality of shots 1202 fabricated using substantially the same fabrication parameters (conditions). Measured line widths of patterns formed within an upper shot 1202U and measured line widths of corresponding patterns formed in a center shot 1202C are compared to show variation across wafer 1200.

Figure 13:
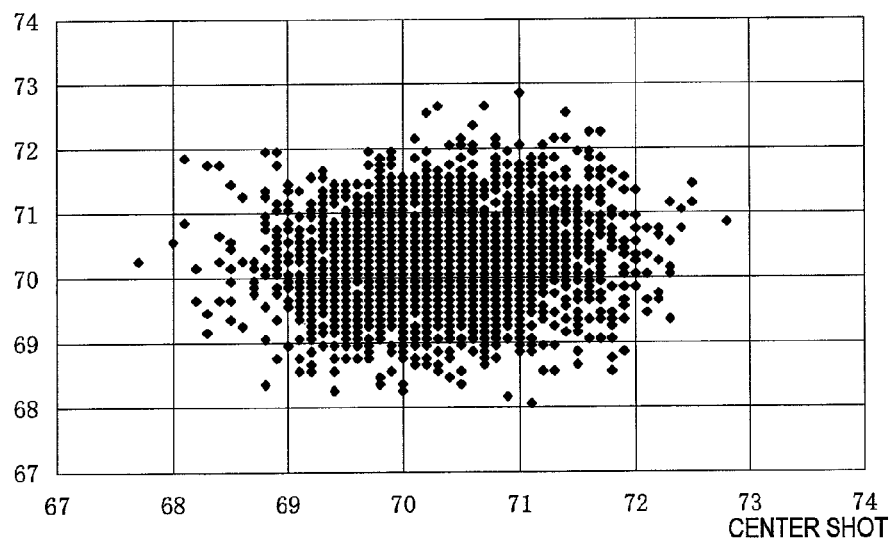
FIG. 13 is a graph illustrating poor or no correlation between measurements of corresponding patterns within an upper shot and a center shot of the wafer of FIG. 12.

FIG. 13 is a graph 1300 illustrating poor or no correlation between measurements of corresponding patterns within upper shot 1202U and center shot 1202C. The horizontal axis represents a line width measurement of a set of patterns in the center shot 1202C and the vertical axis represents a line width measurement of the same set of patterns (in the same position) within upper shot 1202U, and plotted as a diamond. The patterns formed within each shot 1202, and used in the measurements plotted in FIG. 13, have a design width of 70 nm and a design spacing of 60 nm. Since there is poor or no correlation between measurements of corresponding sets of patterns within upper shot 1202U and center shot 1202C, standard deviation of the distribution is large, as seen in FIG. 13. The fabrication quality of the formed patterns within upper shot 1202U and center shot 1202C cannot be adequately evaluated through line width measurement and analysis of corresponding patterns. On the contrary, a difference of average line width measurements of these patterns is drastically smaller than each difference in the corresponding line width measurements. Thus, the average line width measurements are more suitable to assess and control the fabrication processes than the measurements of corresponding sets of patterns.

Figure 14:
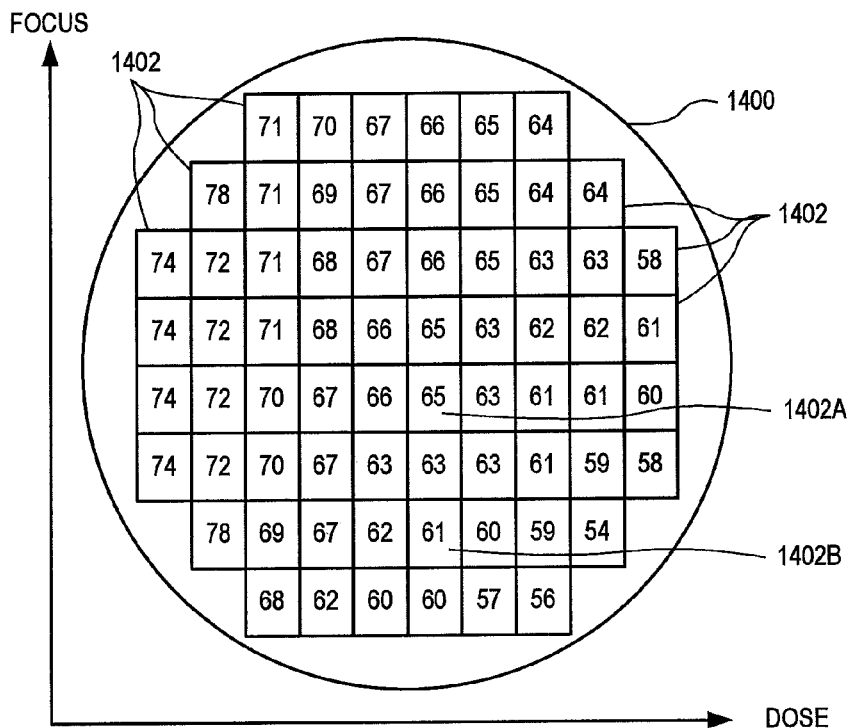
FIG. 14 shows a distribution of average line width measurements of patterns within each shot of a test wafer.
Figure 15:
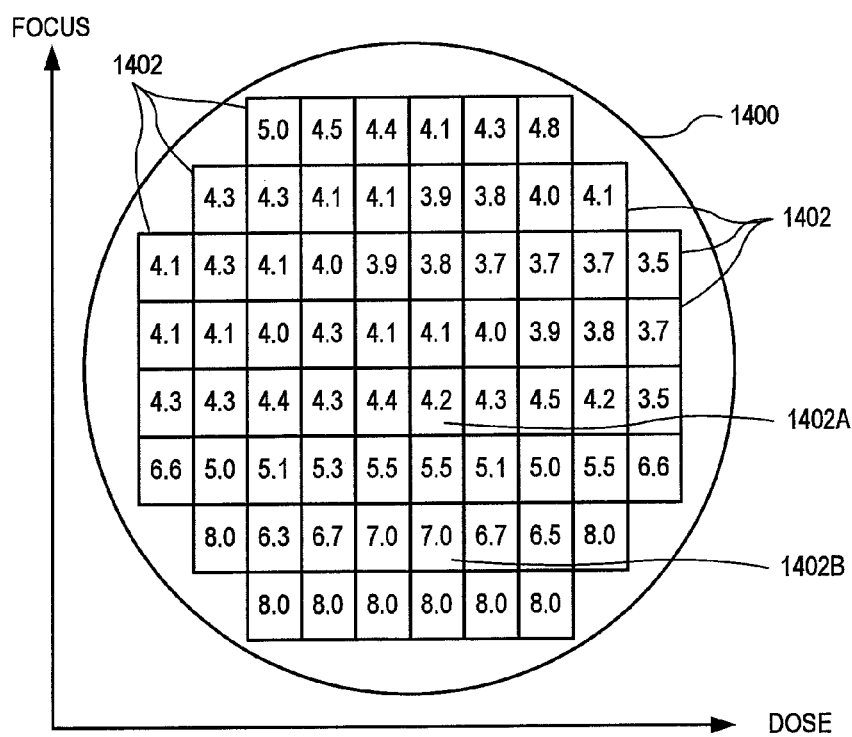
FIG. 15 shows distribution of standard deviation of line width measurements of patterns formed within each shot of the test wafer of FIG. 14.

FIG. 14 shows a distribution of average line width measurements of patterns within each shot of a test wafer 1400. FIG. 15 shows distribution of standard deviation of line width measurements of patterns formed within each shot of test wafer 1400. Test wafer 1400 is fabricated with a plurality of shots, where focus is varied in a vertical direction for each shot, and dose is varied in a horizontal direction for each shot. Thus, each fabricated shot has differing focus and dose conditions. The patterns formed within each shot have consistent design line width and design spacing. FIG. 14 and FIG. 15 are derived from the same line width measurements of corresponding patterns within each shot on the same wafer. As shown in FIG. 14, the average of line width measurements of a shot 1402A is not particularly different from the average of line width measurements of a shot 1402B. However, as shown in FIG. 15, there is a clear difference in the standard deviation of the line width measurements between shots 1402A and 1402B. Thus, where an evaluation of fabrication process conditions is performed using only average values of measured line widths within multiple shots across a wafer, results may not indicate process anomalies, resulting in an undetected inferior semiconductor device. On the other hand, an evaluation using a standard deviation of the line width measurement values would clearly indicate the inferior process conditions.

Accordingly, as shown in FIGS. 14 and 15, by measuring line widths of patterns formed within shots on a wafer, an evaluation of the wafer fabrication process may be statistically determined. System 100, FIG. 1, automatically registers inspection regions (e.g., inspection regions 124, FIGS. 1 and 2, and inspection regions 900, FIG. 9), where each inspection region has an area greater or equal to 1 μm². Registration of an inspection region requires locating the region on the wafer, capturing at least one image of that area of the wafer to form an image of the inspection region and then aligning the captured features in the image with associated features in reference geometry generated from associated design data. Automatic registration of each inspection region is necessary since one or more inspection regions are registered within one or more shots of a wafer, and therefore, the number of inspection regions to be registered may be large, wherein manual registration would require an inordinate amount of time and make measurement and analysis impractical.

The average of a plurality of measurements is made within each inspection region, and results in a more accurate representation of pattern line width as compared to single measurements (as typically performed manually using CD-SEM). The average of the line width measurement allows process conditions to be controlled more accurately, and cause of process condition variation may be further identified through statistical analysis (e.g., standard deviation, maximum, and minimum) of the measured line widths.

In particular, the inspection regions may be automatically selected for shots across the wafer such that variation in process conditions across the wafer may be determined upon analysis of measurements made within each inspection region, wherein statistical analysis of the measurements may indicate unwanted process variation across the wafer.

Line width measurements may be classified and/or sorted prior to statistical analysis to isolate statistical variation for different process conditions. Thus, variation within the process conditions may be identified through statistical analysis of the classified and/or sorted measurement values.

Method of Controlling Variations in Individual Line Widths of Patterns

Using the above systems and methods, during fabrication of a wafer, statistics may be obtained from line width measurements of patterns of a semiconductor device before a fabrication process (e.g., an etch process), and statistics may be obtained from measurements of the patterns of the same semiconductor device after the fabrication process. However, the statistics obtained from the line width measurements made after the fabrication process are indicative of performance of the semiconductor device, and not necessarily of the fabrication process, since variation in gate widths, for example, may have been introduced in a prior fabrication process. In particular, statistics derived from the measurements made after the fabrication process contain (i) a component of features existing prior to the fabrication process and (ii) a component of the effect of the fabrication process. To improve evaluation of the fabrication process, it is desirable to remove the component of features existing prior to the fabrication process, thereby allowing better control of the fabrication process.

Figure 16:
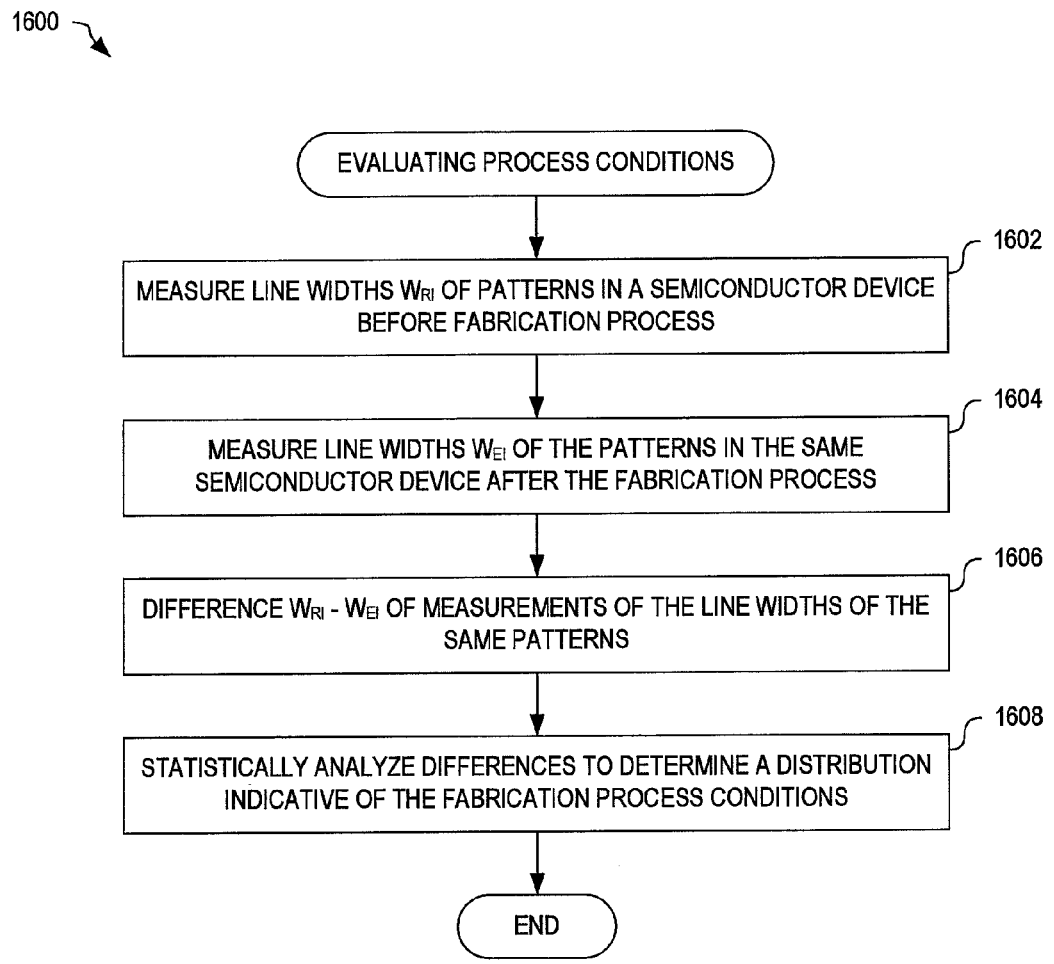
FIG. 16 is a flowchart illustrating one exemplary process for evaluating fabrication process condition.

FIG. 16 is a flowchart illustrating one exemplary process 1600 for evaluating fabrication process condition. Process 1600 is for example implemented within one or both of inspection unit 108 and statistical analyzer 112 of system 100, FIG. 1.

In step 1602, process 1600 measures line widths $W_{Ri}$ of patterns within an inspection region of a semiconductor device before a fabrication process. In one example of step 1602, inspection unit 108 analyzes pattern width measurements 109 generated from at least one inspection region 124, located on a semiconductor device on wafer 122, prior to an etch process that forms part of lithographic process 120 of wafer 122. Each measurement 109 is associated with a location i of $W_{Ri}$.

In step 1604, process 1600 measures line widths $W_{Ei}$ of the patterns within the inspection region of the same semiconductor device after the fabrication process. In one example of step 1604, inspection unit 108 analyzes pattern width measurements 109 generated from the at least one inspection region 124, located on the semiconductor device on wafer 122, after the etch process. Each measurement 109 is associated with the same location i, as in step 1602.

In step 1606, process 1600 calculates the difference $W_{Ri}$-$W_{Ei}$ for the measurement sets captured in steps 1602 and 1604. In one example of step 1606, inspection unit 108 calculates a difference between measurements made prior to the fabrication process and measurements made after the fabrication process for each location i for the semiconductor.

In step 1608, process 1600 statistically analyzed the differences of step 1606 to determine a distribution indicative of the fabrication process conditions. In one example of step 1608, statistical analyzer 112 processes the determined differences $W_{Ri}$-$W_{Ei}$ and generates statistical data 113 that may be used to evaluate the etch process and thereby adjust control parameters of any subsequent etch process (e.g., the etch process performed on subsequent wafers).

In particular, by subtracting measurements $W_{Ei}$ after the fabrication process from measurements. $W_{Ri}$ prior to the fabrication process, only variation in the distribution resulting from the fabrication process is shown in the generated statistic.

The line width measurements may also be classified and sorted, as described above, prior to the step of differencing, such that only selected measurements are differenced and then statistically analyzed.

Figure 17:
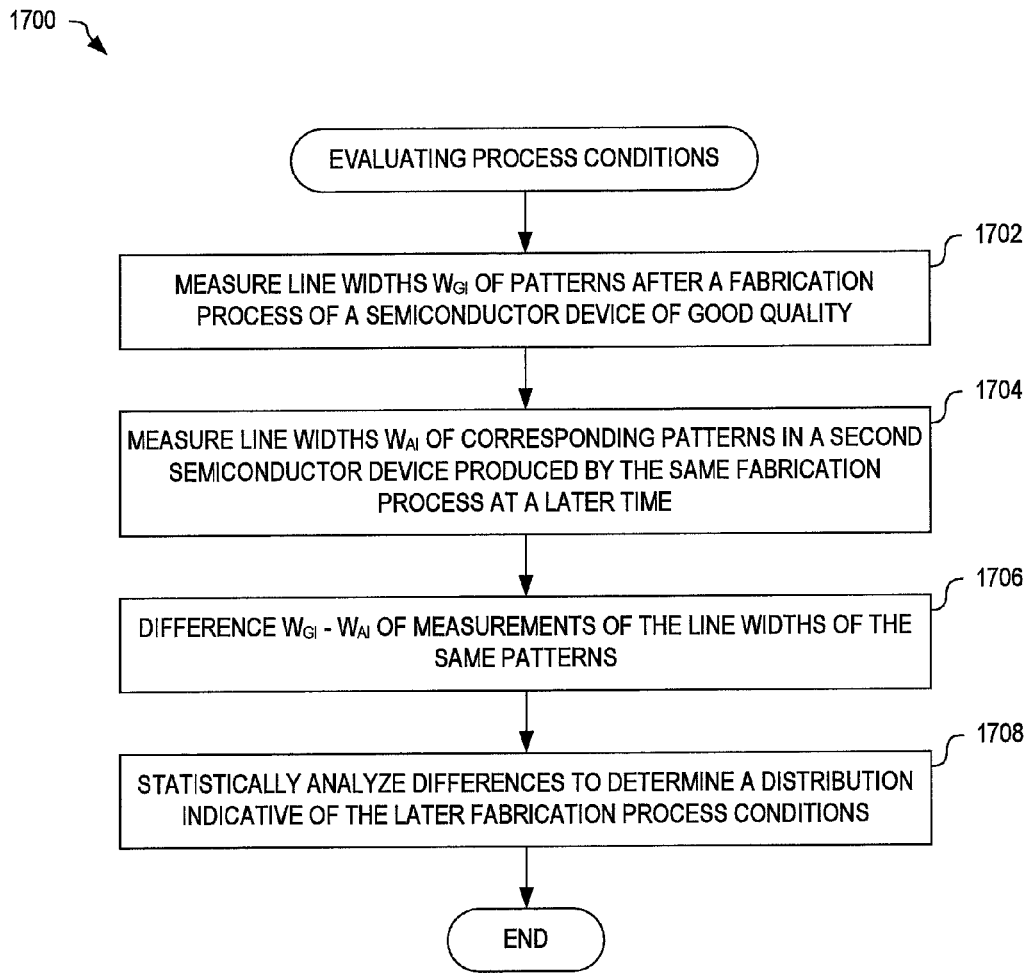
FIG. 17 shows one exemplary process for evaluating a fabrication process by differencing and statistically analyzing line width measurements for a known good quality patterns and patterns produced by substantially the same fabrication process at a later time.

FIG. 17 shows one exemplary process 1700 for evaluating a fabrication process by differencing and statistically analyzing line width measurements for a known good quality patterns and patterns produced by the same fabrication process at a later time. Process 1700 may be implemented within one or both of inspection unit 108 and statistical analyzer 112 of system 100, FIG. 1.

In step 1702, process 1700 measures line widths $W_{Gi}$ of patterns after a fabrication process of a semiconductor device of good quality. In one example of step 1702, inspection unit 108 generates a set of measurements $W_{Gi}$ within one or more inspection regions 124 after an etch process of a semiconductor device, that is determined (e.g., at a later time after complete processing and testing) to be of good quality.

In step 1704, process 1700 measures line widths $W_{Ai}$ of corresponding patterns in a second semiconductor device produced by the same fabrication process at a later time. In one example of step 1704, a wafer containing the same type of semiconductor device produced by the same fabrication process is inspected and a set of measurements $W_{Ai}$ are made for patterns corresponding to the patterns of step 1702. That is, patterns at the same locations within the second semiconductor device as the patterns measured in the semiconductor device that is known to be good.

In step 1706, process 1700 calculates a difference $W_{Gi}$-$W_{Ai}$ of measured line widths of the same patterns. In one example of step 1706, inspection unit 108 generates a measurement set 111 by subtracting set $W_{Ai}$ of step 1702 from set $W_{Gi}$ of step 1704.

In step 1708, process 1700 statistically analyzes the differences to determine a distribution indicative of the later fabrication process conditions. In one example of step 1708, statistical analyzer 112 processes the differences from step 1706 to generate statistical data 113 that indicates variance from the fabrication process of known good quality. In particular, process 1700 generates statistical information that is not based upon variance from design data, but from known good quality results. For example, where a wide wiring pattern of a semiconductor device is fabricated in a different line width from that specified within the design data, the semiconductor may still function correctly. Thus, process 1700 may ignore insignificant variations in the fabrication process from design data, and yet still highlight process condition variations that result in less than good devices.

Smallest Enclosing Rectangle and Maximum Empty Circle

As described in the '766 Application, isolated patterns may be analyzed for selected features, such as by determining a diameter, an area, a length of the periphery, a degree of circularity, a moment, and the like, based upon contours obtained from the image of the feature. However, such analysis is not sufficient where contact holes are selected for inspection and evaluation. Since a contact hole has a different shape from a circle (such as an ellipse or a peanut shape), width and height measurements of these contact holes are insufficient for evaluating fabrication process conditions.

To improve upon this analysis, the obtained contours of contact holes may be used to determine (a) a maximum diameter of a circle that fits within the feature contours (maximum empty circle), and (b) a smallest enclosing rectangle that can contain the feature contours. The measurements obtained for the maximum empty circle and the smallest enclosing rectangle may be used for analyzing fabrication process conditions. In the following example, contact hole features are analyzed to evaluate fabrication processes.

Figure 18:
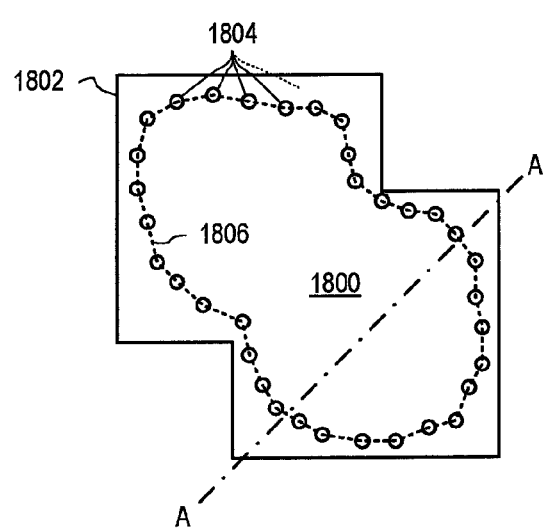
FIG. 18 is a schematic illustrating an exemplary contact hole design data and an exemplary set of detected edges that form a contour for the fabricated contact hole.
Figure 19:
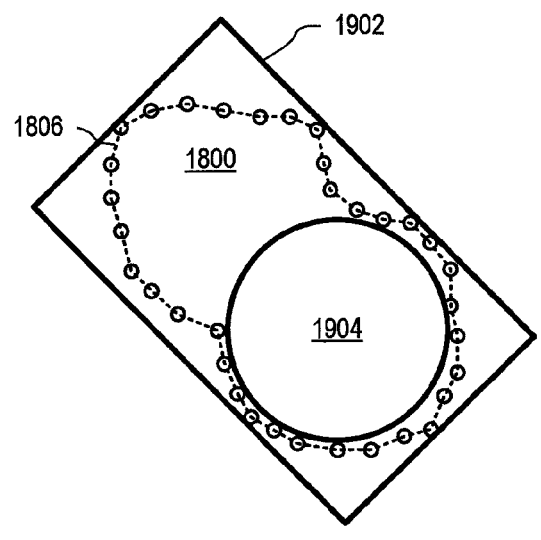
FIG. 19 shows a smallest enclosing rectangle that can be formed around the contour of FIG. 18 and a maximum empty circle that can be formed within the contour.

FIG. 18 is a schematic illustrating an exemplary contact hole design data 1802 and an exemplary set of detected edges 1804 that form a contour 1806 for the fabricated contact hole 1800. Contour 1806 is a polygon formed by connecting detected edges 1804 of contact hole 1800, such that contour 1806 has a shape approximately matching the shape of edges of contact hole 1800. In particular, detected edges 1804 represent second edges of contact hole 1800 detected from an image (e.g., image 103, FIG. 1). FIG. 19 shows a smallest enclosing rectangle 1902 that can be formed around contour 1806 and a maximum empty circle 1904 that can be formed within edge contour 1806. Smallest enclosing rectangle 1902 is a rectangle having the smallest area that includes all vertices of contour 1806. Maximum empty circle 1904 is a circle with the largest radius that can be formed without including a vertex of contour 1806. Smallest enclosing rectangle 1902 and maximum empty circle 1904 may be determined through well known methods of computational geometry.

Where contour 1806 approximates a circle, measurements of smallest enclosing rectangle 1902 and maximum empty circle 1904 have equivalent information. However, where contour 1806 cannot be approximated by a circle, as shown in FIGS. 18 and 19, measurements of smallest enclosing rectangle 1902 and maximum empty circle 1904 may be used to better evaluate fabrication process conditions than simple use of width and height, since the area of smallest enclosing rectangle 1902 may control an area of contact hole 1800 more precisely, even if contact hole 1800 is inclined.

Figure 20A:
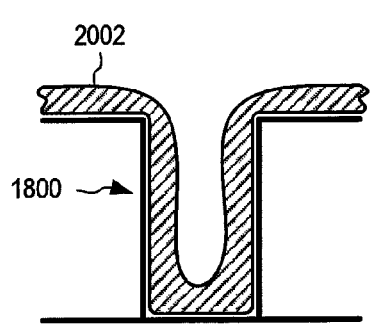
FIG. 20A schematically illustrates a cross section A-A of the contact hole of FIG. 18 where a CVD process deposits a film having a thickness less than the radius of maximum empty circle of FIG. 19.
Figure 20B:
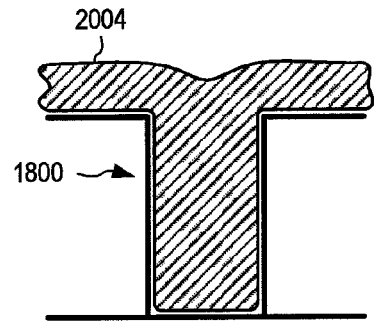
FIG. 20B schematically illustrates a cross section A-A of the contact hole of FIG. 18 where a CVD process deposits a film having a thickness greater than the radius of the maximum empty circle of FIG. 190, resulting in an inferior quality contact hole.

Further, radius of maximum empty circle 1904 may be used to control a following chemical vapor deposition (CVD) process such as may be used for metallization. FIG. 20A schematically illustrates a cross section A-A of contact hole 1800 where a CVD process deposits a film 2002 having a thickness less that the radius of maximum empty circle 1904, resulting in an inferior quality contact. FIG. 20B schematically illustrates a cross section A-A of contact hole 1800 where a CVD process deposits a film 2004 having a thickness greater than or equal to the radius of maximum empty circle 1904. Thus, a CDV process may be controlled by determining the maximum empty circle of contact holes prior to film deposition.

Determined measurements of smallest enclosing rectangle 1902 and maximum empty circle 1904 may be classified and analyzed in a manner similar to the above described gate width measurements for evaluating and controlling fabrication processes. The use of smallest enclosing rectangle 1902 and maximum empty circle 1904 are of particular use in controlling fabrication processes where contact hole 1800 does not approximate a circle, since these determined measurements are of use for contact holes of any shape and orientation.

Classifying Results Using Similarity of Design Data

The above disclosed methodologies for classifying, sorting and analyzing measurements based upon design data do not specifically highlight the effect of pattern shapes upon fabrication processes. That is, these measurements include defects, abnormal measurements, and so on. By classifying the measurements based upon similarities in design data, defects and other abnormal measurements not specifically associated with pattern shapes may be ignored.

In semiconductor lithography and etching, processing of an individual shape may be affected by presence or absence of, and details of, nearby shapes. For example, contact holes may be more difficult to clear if there are large numbers of nearby contacts, possibly due to partial exhaustion of etching plasma in the near neighborhood during etching. Similarly, features having particular shapes, such as U shapes, may be more prone to particular variations in final width and space than others. It can be desirable to identify such problem features and to determine how strong these nearby-feature and feature-shape effects are on critical dimensions of resulting product.

In an embodiment, a method classifies inspection results based upon similarity of associated design data. A difference value indicative of a difference in shape and size of design data patterns is determined between windowed design data for identified features (e.g., identified defects in the inspection results). The smaller the determined difference value, the greater the similarity of the design data patterns.

FIG. 21A shows an identified first defect 2102, around which a first design data windowing region 2104 is centered and used to isolate first design data pattern 2106 that is associated with first defect 2102. Similarly, FIG. 21B shows an identified second defect 2152, around which a second design data windowing region 2154 is centered and used to isolate second design data pattern 2156 that is associated with second defect 2152. Once isolated, first and second design data patterns 2106 and 2156 are processed to determine a difference value indicative of the similarity in shape and size of patterns 2106 and 2156.

In one example of the processing of patterns 2106 and 2156 to determine similarity, a suitable shift quantity is selected for matching a vertex of pattern 2106 and a vertex of pattern 2156. Distances between sides of pattern 2106 and pattern 2156 are then determined while pattern 2156 is shifted by each shift quantity recognized to be suitable for matching.

FIG. 22 shows pattern 2156 of FIG. 21B overlaid upon pattern 2106 of FIG. 21A such that a first vertex of pattern 2106 coincides with a first vertex of pattern 2156 at location 2202. To determine a similarity, the distance from a first side of pattern 2106 to each side of pattern 2156 is determined and the shortest is selected. This is repeated for other sides of pattern 2106, such that a plurality of shortest distances is determined. Similarly, for each side of pattern 2156, a distance to each side of pattern 2106 is determined and the shortest is selected. In the example of FIG. 22, the shortest distance between the top and left sides of pattern 2106 and pattern 2156 is each zero, since the vertices coincide at location 2202; other selected shortest distances 2204 are shown. The largest of these selected shortest distances 2204 is then used as the difference value that defines the similarity between patterns 2106 and 2156. In an alternate embodiment, instead of selecting a shortest distance, the largest of the average of determined distances may be used as the difference value to define the similarity of patterns.

In yet another embodiment, a ratio $R_{O/A}$ of an area of a polygon $P_{OR}$ obtained by the summation operation OR of the patterns within windowed design data and an area of a polygon $P_{AND}$ obtained by the product operation AND of the patterns in the windowed design data may be used as the difference value defining the similarity of the patterns. Other values obtained from polygons $P_{OR}$ and $P_{AND}$ may be used to define similarity, without departing from the scope hereof.

Furthermore, a value obtained from matching of images converted from the windowed design data may be used as the distance between the windowed design data. However, in the case of using the shortest distance, calculation is fastest because calculation may be discontinued when one of the shortest distances obtained for any side exceeds an allowable distance between the windowed design data after matching.

Difference values obtained by one of the above methods for all pairs of defects identified for a particular test subject (e.g., wafer 122, or shot 123 thereof) may be stored in a table. FIG. 23 shows an exemplary table 2300 that contains difference values, located at the crossing positions, for five identified defects, $D_1$ through $D_5$. For example, entry 2302 has a value of 50 and represents the comparison of defects $D_3$ and $D_4$.

Difference values of table 2300 allow defects to be grouped according to similarity of patters associated with the defects. Using a difference value threshold of 15, table 2300 results in a first grouping that includes defects $D_1$, $D_2$ and $D_3$, and a second grouping that includes $D_4$ and $D_5$. That is, difference values between defects $D_1$, $D_2$ and $D_3$ are less than 15, and difference values of defects $D_4$ and $D_5$ are less than 15.

In the current embodiment and examples, design data is used to determine similarity between patterns associated with identified defects. In alternate embodiments, other data may be used to determine similarity of patterns associated with defects. For example, mask data corresponding to the design data may be processed to determine pattern similarity, and contours of a simulation pattern obtained from a lithography simulation may be used to determine pattern similarity. By classifying and grouping defects based upon pattern similarity, pattern shapes that are associated with large groups of defects can be easily identified.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An inspection apparatus for inspecting patterns formed on a wafer by using an image of said patterns and data for fabricating said patterns, comprising:
    an imager for capturing at least one image of each of a plurality of inspection regions on the wafer;
    a reference pattern generator for generating a reference pattern for each of the inspection regions from design data of the wafer, the reference pattern being formed of one or both of (a) one or more line segments and (b) one or more curves; and
    an inspection unit configured to perform:
        detecting edges within each of the images;
        automatically selecting patterns within each of the inspection regions based upon tendency for measurement variation resulting from variation in the fabrication process;
        comparing, for the selected patterns, certain of the edges with associated line segments and curves of the reference pattern to determine one or both of (a) a maximum empty circle within the boundary of the certain edges and (b) an arbitrarily oriented smallest enclosing rectangle that includes the certain edges; and
        generating defect information based upon one or both of the maximum empty circle and the smallest enclosing rectangle.

2. The inspection apparatus of claim 1, wherein the selected patterns are selected from the group consisting of contact hole, and via.

3. A pattern inspection apparatus for inspecting a pattern by using an image of the pattern and data for fabricating the pattern, the pattern inspection apparatus comprising:
    an image generation device configured to generate the image of the pattern;
    a processor adapted to execute machine readable instructions; and
    a memory storing a plurality of machine readable instructions for execution by the processor that when executed perform the steps of:
    detecting edges within the images of the pattern,
    storing in the memory a reference pattern generated from the data, the reference pattern represented by one or both of (i) one or more line segments, and (ii) one or more curves, the reference pattern generated from the data;
    storing in the memory measured line widths of the image;
    inspecting the pattern by using at least one of distances between the detected edges and at least one of the line segments and the curves of the reference pattern to obtain a defect; and
    classifying the defect by (i) applying, within the design data and centered on the location of each of the defects, a windowing region to select a windowed pattern associated with the defect; (ii) obtaining a distance between the windowed pattern associated with the defect against each windowed pattern associated with the other defects for each pair of defects; and (iii) grouping defects having distances less than a predefined difference value threshold.

4. The apparatus of claim 3, wherein the distance between the windowed pattern associated with the defect against each windowed pattern associated with the other defects is obtained from a distance between a vertex of one windowed pattern and a line of the other windowed pattern.

5. A method of evaluating a wafer fabrication process for forming patterns on a wafer based upon design data, comprising:
    defining two or more inspection regions on the wafer for analysis;
    capturing at least one image in each of the inspection regions on the wafer using an image acquiring device;
    storing in a memory a reference pattern generated from the data, the reference pattern represented by one or both of (i) one or more line segments, and (ii) one or more curves, the reference pattern generated from the data;

detecting edges within each of the images;

automatically selecting patterns within each of the inspection regions based upon tendency for measurement variation resulting from variation in the fabrication process;

comparing, for the selected patterns, certain of the edges with associated line segments and curves of the reference pattern to determine one or both of (a) a maximum empty circle within the boundary of the certain edges and (b) an arbitrarily oriented smallest enclosing rectangle that includes the certain edges; and generating defect information based upon one or both of the maximum empty circle and the smallest enclosing rectangle.

6. The method of claim 5, wherein the selected patterns are selected from the group consisting of contact hole, and via.

7. A method of evaluating a wafer fabrication process for forming patterns on a wafer based upon design data, comprising:

defining an inspection region on the wafer for analysis;

capturing at least one image in the inspection region on the wafer;

storing in a memory a reference pattern generated from the data, the reference pattern represented by one or both of (i) one or more line segments, and (ii) one or more curves, the reference pattern generated from the data;

detecting edges within each of the images;

storing in the memory measured line widths of the image;

inspecting the pattern by using at least one of distances between the detected edges and at least one of the line segments and the curves of the reference pattern to obtain a defect; and classifying the defect by (i) applying, within the design data and centered on the location of each of the defects, a windowing region to select a windowed pattern associated with the defect; (ii) obtaining a distance between the windowed pattern associated with the defect against each windowed pattern associated with the other defects for each pair of defects; and (iii) grouping defects having distances less than a predefined difference value threshold.

8. The method of claim 7, wherein the distance between the windowed pattern associated with the defect against each windowed pattern associated with the other defects is obtained from a distance between a vertex of one windowed pattern and a line of the other windowed pattern.

* * * * *